US008522552B2

(12) United States Patent
Waterstripe et al.

(10) Patent No.: US 8,522,552 B2
(45) Date of Patent: Sep. 3, 2013

(54) THERMODYNAMIC POWER GENERATION SYSTEM

(75) Inventors: Robert F. Waterstripe, Sebastian, FL (US); Gary P. Hoffman, Middlesex, NY (US); Richard L. Willoughby, Fairport, NY (US)

(73) Assignee: American Thermal Power, LLC, Sebastian, FL (US)

( * ) Notice: Subject to any disclaimer, the term of this patent is extended or adjusted under 35 U.S.C. 154(b) by 276 days.

(21) Appl. No.: 12/858,265

(22) Filed: Aug. 17, 2010

(65) Prior Publication Data
US 2011/0036091 A1 Feb. 17, 2011

Related U.S. Application Data

(63) Continuation-in-part of application No. 12/708,088, filed on Feb. 18, 2010.

(60) Provisional application No. 61/154,020, filed on Feb. 20, 2009.

(51) Int. Cl.
F01K 27/00 (2006.01)
F01K 13/00 (2006.01)
F01K 25/08 (2006.01)
F01K 25/00 (2006.01)
F01K 1/00 (2006.01)
F01K 3/00 (2006.01)
F03G 7/00 (2006.01)
F03B 1/00 (2006.01)

(52) U.S. Cl.
USPC ............ 60/670; 60/641.1; 60/645; 60/651; 60/659; 60/671; 415/202; 415/80

(58) Field of Classification Search
USPC ............... 60/645–683, 641.1–15; 415/202, 415/80–81
See application file for complete search history.

(56) References Cited

U.S. PATENT DOCUMENTS 552,066 A * 12/1895 Laval ........................ 451/303
3,501,249 A  3/1970 Scalzo et al.
(Continued)

FOREIGN PATENT DOCUMENTS
DE 19935243 2/2001
GB 023286 11/1912
GB 613780 12/1948

Primary Examiner — Thomas Denion
Assistant Examiner — Steven D. Shipe
(74) Attorney, Agent, or Firm — McHale & Slavin, P.A.

(57) ABSTRACT

A power generation system that includes a heat source loop, a heat engine loop, and a heat reclaiming loop. The heat can be waste heat from a steam turbine, industrial process or refrigeration or air-conditioning system, solar heat collectors or geothermal sources. The heat source loop may also include a heat storage medium to allow continuous operation even when the source of heat is intermittent. Heat from the heat source loop is introduced into the heat reclaiming loop or turbine loop. In the turbine loop a working fluid is boiled, injected into the turbine, recovered condensed and recycled. The power generation system further includes a heat reclaiming loop having a fluid that extracts heat from the turbine loop. The fluid of the heat reclaiming loop is then raised to a higher temperature and then placed in heat exchange relationship with the working fluid of the turbine loop. The power generating system is capable of using low temperature waste heat is approximately of 150 degrees F. or less. The turbine includes one or more blades mounted on a rotating member. The turbine also includes one or more nozzles capable of introducing the gaseous working fluid, at a very shallow angle on to the surface of the blade or blades at a very high velocity. The pressure differential between the upstream and downstream surfaces of the blade as well as the change in direction of the high velocity hot gas flow create a combined force to impart rotation to the rotary member.

36 Claims, 26 Drawing Sheets

(56) References Cited

U.S. PATENT DOCUMENTS

| | | | | |
|---|---|---|---|---|
| 3,822,554 | A | 7/1974 | Kelly | |
| 3,953,973 | A | 5/1976 | Cheng et al. | |
| 3,972,195 | A | 8/1976 | Hays et al. | |
| 4,033,141 | A * | 7/1977 | Gustafsson | 62/238.4 |
| 4,073,069 | A * | 2/1978 | Basmajian | 434/389 |
| 4,236,868 | A | 12/1980 | Linhardt | |
| 4,292,809 | A * | 10/1981 | Bjorklund | 60/676 |
| 4,400,137 | A | 8/1983 | Miller | |
| 4,421,454 | A | 12/1983 | Wosika | |
| 4,437,316 | A * | 3/1984 | Dyer et al. | 62/79 |
| 4,475,343 | A | 10/1984 | Dibelius et al. | |
| 4,502,838 | A | 3/1985 | Miller et al. | |
| 4,503,682 | A | 3/1985 | Rosenblatt | |
| 4,516,402 | A | 5/1985 | Chang | |
| 4,565,161 | A | 1/1986 | Choquette | |
| 4,585,395 | A | 4/1986 | Nourse et al. | |
| 4,907,410 | A * | 3/1990 | Chang | 60/641.6 |
| 5,074,754 | A * | 12/1991 | Violette | 416/248 |
| 5,246,342 | A * | 9/1993 | Bergstein | 416/197 A |
| 5,272,878 | A * | 12/1993 | Schlichtig | 60/655 |
| 5,421,157 | A | 6/1995 | Rosenblatt | |
| 5,537,823 | A | 7/1996 | Vogel | |
| 5,724,814 | A | 3/1998 | Ven et al. | |
| 5,809,791 | A * | 9/1998 | Stewart, III | 62/115 |
| 6,052,997 | A | 4/2000 | Rosenblatt | |
| 6,430,918 | B1 | 8/2002 | Chow et al. | |
| 6,597,397 | B1 * | 7/2003 | Stephenson et al. | 348/231.99 |
| 6,638,006 | B2 | 10/2003 | Selby | |
| 6,655,919 | B2 | 12/2003 | Rossi et al. | |
| 6,715,313 | B1 | 4/2004 | Takafu | |
| 6,799,948 | B2 | 10/2004 | Ito | |
| 6,913,076 | B1 | 7/2005 | Hayes | |
| 7,010,920 | B2 | 3/2006 | Saranchuk et al. | |
| 7,062,913 | B2 | 6/2006 | Christensen et al. | |
| 7,096,665 | B2 | 8/2006 | Stinger et al. | |
| 7,469,540 | B1 * | 12/2008 | Knapton et al. | 60/618 |
| 7,603,860 | B2 * | 10/2009 | Thomas | 60/650 |
| 2005/0178124 | A1 * | 8/2005 | Kirby et al. | 60/653 |
| 2006/0196187 | A1 * | 9/2006 | Zimron et al. | 60/651 |
| 2006/0196958 | A1 * | 9/2006 | Dancey et al. | 237/67 |
| 2007/0000281 | A1 * | 1/2007 | Manole | 62/513 |
| 2007/0087307 | A1 * | 4/2007 | Flock et al. | 433/132 |
| 2008/0022683 | A1 * | 1/2008 | Ohler et al. | 60/641.8 |
| 2008/0128188 | A1 | 6/2008 | Giechau | |
| 2009/0126381 | A1 * | 5/2009 | Diaz | 62/238.1 |
| 2010/0031953 | A1 * | 2/2010 | Penev et al. | 126/615 |
| 2010/0176602 | A1 * | 7/2010 | Shinnar | 290/1 A |
| 2010/0263380 | A1 * | 10/2010 | Biederman et al. | 60/651 |
| 2011/0113780 | A1 * | 5/2011 | Lehar | 60/651 |
| 2011/0252796 | A1 * | 10/2011 | Burkhart | 60/641.2 |

* cited by examiner

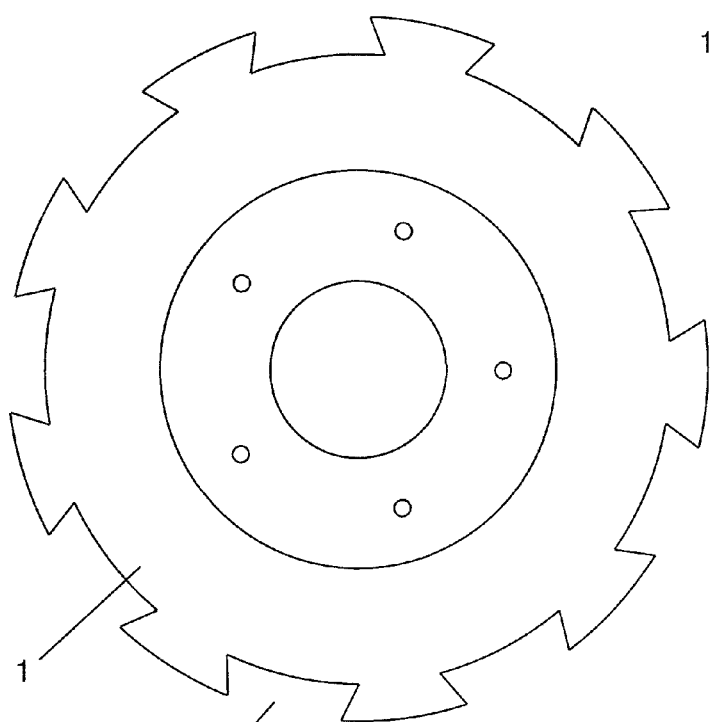
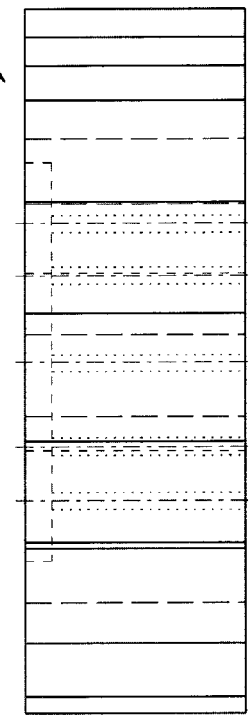
FIGURE 2A          FIGURE 2B
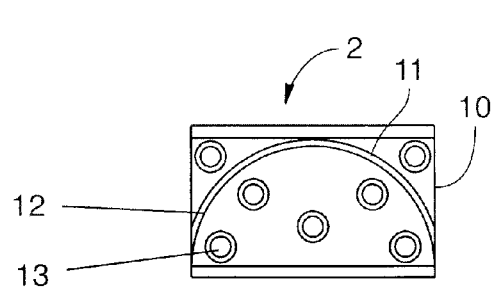
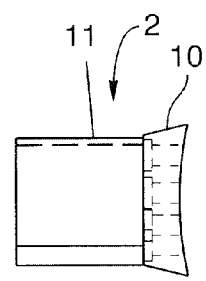
FIGURE 3A          FIGURE 3B

CONVERGING TO PARALLEL NOZZLE
GAS FLOW THROUGH BLADE

CONVERGING TO DIVERGING NOZZLE
GAS FLOW THROUGH BLADE

ALTERNATE HEAT SOURCE
GENERATOR SET WITH BUFFERING HEAT EXCHANGE
DIRECT INJECTION OF HEAT INTO HEAT PUMP

ALTERNATE HEAT SOURCE
GENERATOR SET WITH BUFFERING HEAT EXCHANGE
DIRECT INJECTION OF HEAT INTO HEAT PUMP

THERMODYNAMIC POWER GENERATION SYSTEM

CROSS REFERENCE TO RELATED APPLICATIONS

This application is a continuation-in-part of U.S. patent application Ser. No. 12/708,088, entitled "Thermodynamic Power Generation System" filed on Feb. 18, 2010, which in turn claims the benefit of the filing date of U.S. Provisional Patent Application No. 61/154,020, filed on Feb. 20, 2009, the entire contents of which are herein incorporated by reference.

FIELD OF THE INVENTION

The present invention relates to externally heated engines. More particularly the invention relates to improvements in efficiency and performance of externally heated engines operating at low temperatures and pressures.

BACKGROUND OF THE INVENTION

Externally heated engines especially those similar to the gas or liquid turbine type engines have always held great promise. This is because such engines are reasonably efficient, relatively simple in their operation, and flexible in the media they can employ as working fluids. At the same time however, they have been held back in many applications by certain serious limitations.

Turbine style engines that employ liquid fluid flows are the most limited. Unless one has access to a dam, with a large head of water behind it, or a particularly rapidly flowing stream with a large drop in elevation, one cannot produce significant amounts of power. Without a dam or a stream it is simply not feasible or efficient to heat the liquid sufficiently, or to pump it uphill far enough and cheaply enough, to obtain a useful net output. Similarly, a paddle wheel type structure such as found on certain steam ships for instance, require a separate source of motive power, such as a steam engine, to operate them.

Turbine type engines that employ flows of a gaseous fluid hold more promise. It is practical to employ fluids in the gas phase to power engines, as in steam locomotives for example. Other types of hot gas turbines are also well known in the prior art, and can operate effectively. In virtually all of these cases however, the required temperatures and pressures to which the gas must be raised are very high. It is not uncommon for such engines to reach temperatures of hundreds of degrees Fahrenheit, and at the same time to operate at pressures of hundreds of PSI. In general, this means that a source of combustion must be specifically provided and operated in conjunction with the engine, for the sole benefit of the engine, in order to reach the operating levels required.

Old style steam locomotives and stationary steam engines for instance ran on large coal fires, operating in conjunction with pressure-raising pumps, to produce the required levels. Such engines were well known for exploding at inopportune times.

Gas turbine engines, such as those used at electrical generation stations, also employ very high temperatures and pressures. Jet turbine engines, such as those employed on aircraft, also produce extremely high temperatures in their combustion chambers, and they further employ multiple stages of compression to reach the desired pressures and temperatures.

The present invention is directed to a heat engine and power generating system that avoids high temperatures and pressure and relies instead on relatively low temperature heat sources and low pressure operating fluids to generate energy. The system will function without the need for our own dedicated source of combustion in order to operate and will operate at a relatively high efficiency, and produce significant amounts of power. The engine is designed to operate on low temperature waste heat left over from other processes, or to operate on low temperature solar, geothermal power, power plant waste heat, or waste heat available from air conditioning or refrigeration units or for instance.

DESCRIPTION OF THE PRIOR ART

The configuration of turbine power plants including in particular the turbine blades on a rotating member, the housing construction and the working fluid inlet and exhaust ports have been the subject of many prior art patents.

U.S. Pat. No. 3,501,249 to Scalzo, is directed to turbine rotors and particularly to structure for locking the turbine rotor blades in the periphery of the blade supporting disk.

U.S. Pat. No. 4,073,069 to Basmajian discloses an apparatus comprising a turbine rotor wheel made of a central circular disc with arc-bent plate turbine blades mounted on and bonded to the disc at close and regular intervals around the disc periphery and a stator-housing with a transparent cover for enclosing the turbine wheel, holding one or more feed nozzles and providing a stator reaction mount for the nozzles, the wheel and its housing being mounted from an instrument chassis containing parameter adjusting means and turbine output adjusting and measuring means to provide a compact, economical demonstrator of turbine operation.

U.S. Pat. No. 4,400,137 to Miller et al discloses a rotor assembly and methods for securing rotor blades within and removing rotor blades from rotor assemblies. The rotor assembly comprises a rotor disc defining a plurality of blade grooves, and including a plurality of tenons disposed between the blade grooves and defining a plurality of pin sockets radially extending inward from outside surfaces of the tenons; and a plurality of rotor blades, each blade including a root disposed within a blade groove to secure the blade against radial movement, and a blade platform overlaying a tenon and defining a radially extending pin aperture. The rotor assembly further comprises a plurality of locking pins radially extending through the pin apertures and into the pin sockets to secure the rotor blades against axial movement, each pin including a head and a base to limit radial movement of the pin.

U.S. Pat. No. 4,421,454 to Wosika discloses a full admission radial impulse turbine and turbines with full admission radial impulse stages. The turbines are of the single shaft, dual pressure type. Provision is made for utilizing working fluid exhausted from the high pressure section, in which the radial impulse stage(s) are located, in the low pressure section which contains axial flow turbine stages. The (or each) radial impulse stage in the dual pressure turbine has a rotor or wheel with buckets or pockets oriented transversely to the direction of wheel rotation and opening onto the periphery of the wheel. Working fluid is supplied to the buckets via nozzles formed in, or supported from, a nozzle ring surrounding the turbine wheel and aligned with the entrance ends of the buckets.

U.S. Pat. No. 4,502,838 to Miller et al discloses buckets of a turbine wheel that are formed as a series of equally spaced, overlapping U-shaped passages in the rim of a wheel blank. In the machining operation, an island is left as the inner segment of the curved portion of the U and this is used in combination with labyrinth seals to provide a fluid seal between the inlet and the outlet portion of each bucket.

U.S. Pat. No. 5,074,754 to Violette discloses a retention system for a rotor blade that utilizes the combination of a fixed retention flange and a removable retention plate with a closed-sided retention member. This system enables the rapid replacement or removal of the rotor blade for inspection, maintenance, or replacement purposes without requiring removal of surrounding major engine components or structural members. The rotor blade is installed in a retention member contained in a rotatable hub (not shown) by inserting an outwardly extending portion of a shaped blade root of the rotor blade below a radially-inwardly projecting shaped flange peripherally disposed within the interior of the retention member's structure. A removable shaped retention plate, which is releasably secured to, and adapted to mate with, the retention member, then captures and secures another outwardly extending portion of the shaped root of the rotor blade with a releasable fastener. The shaped root is secured within the retention member without a direct bolted connection. Preloading the fastener induces compressive loading among the system components, resulting in the attenuation or elimination of fretting and wear of their respective component surfaces.

The prior art includes many examples of power systems that attempt to capture waste heat from a primary heat source and reuse the energy in a secondary power system.

U.S. Pat. No. 3,822,554 to Kelly discloses a heat engine operating between temperatures T1 (low) and T2 (high) includes separate vapor closed-cycle motor and pump systems, in heat-exchange relation at T1 and T2, and heat-exchangers between the condensates of said systems.

U.S. Pat. No. 3,953,973 to Cheng et al discloses a heat engine, or a heat pump, in which the working medium is subjected alternatively to solidification and melting operations. A working medium is referred to as an S/L type working medium that is subjected to cyclic operations, each cycle comprises of a high temperature melting step conducted under a first pressure, and a low temperature solidification step conducted under a second pressure. Each heat pump cycle includes a high temperature solidification step conducted under a first pressure and a low temperature melting step conducted under a second pressure. When a non-aqueous medium is used, the first pressure and the second pressure are a relatively high pressure and a relatively low pressure, respectively. When an aqueous medium is used the two pressures are a relatively low pressure and a relatively high pressure, respectively. The operation of a heat pump is the reverse operation of a heat engine.

U.S. Pat. No. 4,292,809 to Björklund discloses a procedure for converting low-grade thermal energy into mechanical energy in a turbine for further utilization. The procedure is characterized in that a low-grade heating medium and a first cooling medium are evaporated in a heat exchanger. The steam is carried to a turbine for energy conversion and moist steam is carried from here to a heat exchanger for condensing. The condensate is pumped back to the heat exchanger. The heat exchanger is common to the steam turbine circuit and a heat pump circuit in such a manner that the heat exchanger comprises a condenser for the steam turbine circuit and an evaporator in the heat pump circuit. The heat removed in connection with condensing can be absorbed by a second evaporating cooling medium the steam of which is pumped via a heat pump to a heat exchanger which is cooled by cooled medium from the heat exchanger and where condensing takes place. The condensate is carried via an expansion valve back to the heat exchanger while outgoing cooled medium from the heat exchanger is either heated in its entirety to a lower level than the original temperature at the commencement of the process or else a partial flow is reheated to a level that is equal to or higher than the original temperature at the commencement of the process and returned to the heat exchanger. The hot gas of the heat pump is used for extra superheating of the ingoing first evaporated cooling medium supplied to the turbine.

U.S. Pat. No. 4,475,343 to Dibelius et al discloses a method for the generation of heat using a heat pump in which a heat carrier fluid is heated by a heat exchanger and compressed with temperature increase in a subsequent compressor, heat is delivered therefrom to a heat-admitting process; the fluid is then expanded in a gas turbine, producing work, and afterwards its residual heat is delivered to a thermal power process, the maximum temperature of the energy sources of which, that provide work for the compressor, lies below the temperature of heat delivery. The main heat source can consist of an exothermic chemical or nuclear reaction and the heat-admitting process can be a coal gasification process. The work in the compressor is furnished essentially by the gas turbine and the thermal power process.

U.S. Pat. No. 4,503,682 to Rosenblatt discloses an engine system that includes a synthetic low temperature sink which is developed in conjunction with an absorbtion-refrigeration subsystem having inputs from an external low-grade heat energy supply and from an external source of cooling fluid. A low temperature engine is included which has a high temperature end that is in heat exchange communication with the external heat energy source and a low temperature end in heat exchange communication with the synthetic sink provided by the absorbtion-refrigeration subsystem. It is possible to vary the sink temperature as desired, including temperatures that are lower than ambient temperatures such as that of the external cooling source. This feature enables the use of an external heat input source that is of a very low grade because an advantageously low heat sink temperature can be selected.

U.S. Pat. No. 5,421,157 to Rosenblatt discloses a low temperature engine system that has an elevated temperature recuperator in the form of a heat exchanger having a first inlet connected to an extraction point at an intermediate position between the high temperature inlet and low temperature outlet of a turbine heat engine and an outlet connected by a conduit to a second inlet to the turbine between the high and low temperature ends thereof and downstream of the extraction point. In the recuperator thermodynamic medium vapor from extraction point is in heat exchange relationship with thermodynamic medium conducted from the low temperature exhaust end of the turbine unit through a water cooled condenser and in heat exchange relationship in a refrigerant condenser with a refrigerant flowing in an absorption-refrigeration subsystem. The thermodynamic medium leaving the recuperator for return to the turbine is conducted through return conduit in further heat exchange relationship with the refrigerant of the absorbent-refrigerant subsystem and is heated in a heat exchanger by an external source of heat energy and is returned to the high temperature end of the turbine through conduit to complete the cycle. External coolant, such as water, is conducted through the thermodynamic-medium condenser in heat exchange relation with the thermodynamic medium passing there through from the low temperature exhaust end of the turbine.

U.S. Pat. No. 5,537,823 to Vogel, discloses a combined cycle thermodynamic heat flow process for the high efficiency conversion of heat energy into mechanical shaft power. This process is particularly useful as a high efficiency energy conversion system for the supply of electrical power (and in appropriate cases thermal services). The high efficiency energy conversion system is also disclosed. A preferred system comprises dual closed Brayton cycle systems, one functioning as a heat engine, the other as a heat pump, with their respective closed working fluid systems being joined at a common indirect heat exchanger. The heat engine preferably is a gas turbine, capable of operating at exceptionally high efficiencies by reason of the ability to reject heat from the expanded turbine working fluid in the common heat exchanger, which is maintained at cryogenic temperatures by the heat pump system. The heat pump system usefully employs gas turbine technology, but is driven by an electric motor deriving its energy from a portion of the output of the heat engine.

U.S. Pat. No. 6,052,997 to Rosenblatt discloses an improved combined cycle low temperature engine system having a circulating expanding turbine medium that is used to recover heat as it transverses it turbine path. The recovery of heat is accomplished by providing a series of heat exchangers and presenting the expanding turbine medium so that it is in heat exchange communication with the circulating refrigerant in the absorption refrigeration cycle. Previously recovery of heat from an absorption refrigeration subsystem was limited to cold condensate returning from the condenser of an ORC turbine on route to its boiler.

U.S. Pat. No. 7,010,920 to Saranchuk et al discloses a low temperature heat engine that circulates waste heat back through a heat exchanger to the prime mover inlet. The patent discloses a method for producing power to drive a load using a working fluid circulating through a system that includes a prime mover having an inlet and an accumulator containing discharge fluid exiting the prime mover. A stream of heated vaporized fluid is supplied at relatively high pressure to the prime mover inlet and is expanded through the prime mover to a lower pressure discharge side where discharge fluid enters an accumulator. The discharge fluid is vaporized by passing it through an expansion device across a pressure differential to a lower pressure than the pressure at the prime mover discharge side. Latent heat of condensation in the discharge fluid being discharged from the prime mover is transferred by a heat exchanger to discharge fluid that has passed through the expansion device. Vaporized discharge fluid, to which heat has been transferred from fluid discharged from the prime mover, can be returned through a compressor and vapor drum to the prime mover inlet. Vaporized discharge fluid can be removed directly from the accumulator by a compressor where it is pressurized slightly above the pressure in the vapor drum, to which it is delivered directly, or it can be passed through a heat exchanger where the heat from the compressed fluid is transferred to an external media after leaving the compressor in route to the vapor drum. Liquid discharge fluid from the accumulator is pumped to a boiler liquid drum, then to the vapor drum through a heat exchanger. The liquid discharge fluid may be expanded through an orifice to extract heat from an external source at heat exchanger and discharged into the vapor drum or the accumulator, depending on its temperature upon leaving heat exchanger.

U.S. Pat. No. 7,096,665 to Stinger et al discloses a Cascading Closed Loop Cycle (CCLC) and Super Cascading Closed Loop Cycle (Super-CCLC) systems are described for recovering power in the form of mechanical or electrical energy from the waste heat of a steam turbine system. The waste heat from the boiler and steam condenser is recovered by vaporizing propane or other light hydrocarbon fluids in multiple indirect heat exchangers; expanding the vaporized propane in multiple cascading expansion turbines to generate useful power; and condensing to a liquid using a cooling system. The liquid propane is then pressurized with pumps and returned to the indirect heat exchangers to repeat the vaporization, expansion, liquefaction and pressurization cycle in a closed, hermetic process. The system can be utilized to generate power from low temperature heat sources.

Although numerous attempts have been made to capture waste heat from a primary heat source and reuse the energy in a secondary power system all of these attempts have fallen short. Thus, what is needed is an efficient, reliable and cost effect power system and heat engine that utilizes low temperature waste heat and is capable of operation using a low temperature and pressure working fluid.

SUMMARY OF THE INVENTION

Briefly described, the present invention includes an externally heated engine contained within an enclosure. A rotating member is mounted within the enclosure on bearings, with a shaft that extends through a seal, to the outside of the engine. Mounted upon the rotating member are one or more blades. A flow of gasses is directed upon the surface of these blades by the action of one or more stationary nozzles. As a result of the action of the gasses upon the blades, force is exerted upon the blades. This causes the rotating member to revolve, and torque is exerted upon the shaft while it rotates.

A rotating shaft is able to perform work, and this is accomplished by coupling the shaft to an electrical generating device thereby producing electrical power. Very large volumes of useful, moderate pressure gas are produced easily in this invention, at low temperatures, by using a working fluid such as a refrigerant. For instance, refrigerant R134 is one possible type of working fluid. Many other standard refrigerant types are also suitable. This refrigerant, in its liquid form, will boil very readily at low temperatures and pressures, and produce voluminous amounts of hot gas after being heated. R134 gas is particularly suited for this purpose, and completely avoids the need for high pressures and temperatures.

The blades mounted on the rotating member of the instant invention are not of traditional design. Prior art blades tend to be made for either high pressure and temperature gas flows—like in a jet engine for instance—or for flows of liquids, especially water, as in a hydroelectric plant for instance. These blades do not function well for low pressure and temperature gasses. The instant invention overcomes the limits of the prior art by combining a unique blade design with a particular design, to thereby extract power effectively under the desired conditions.

As configured, the nozzle directs the flow almost straight on to the surface of the blade. This creates a higher pressure on the upstream side of the blade than on the downstream side, and due to this impact effect, the pressure differential, delta P, produces a net force on the blade in the desired direction. Even a few pounds of delta P can produce a large torque if the blade surface area is great enough, and the diameter of the rotating member is large.

In addition, the blade design additionally takes advantage of the change of momentum in a flow that is produced by the geometry of the blade and the flow of the hot gaseous working fluid. By reversing the flow of working fluid the resulting reaction force on the blade will be large, and in the desired direction. The momentum of a flow of gas is proportional to the square of its velocity, and so the nozzles are designed to greatly accelerate the velocity of the flow, prior to reaching the blade.

The force generated by the velocity of the gas flow is a vector quantity, and so a change in direction can be as effective as a change in speed. So, rather than have the flow crash to rest up against the blade surface, the blade surface is curved, and in turn the flow is also turned almost 180 degrees.

This produces a momentum change almost double that than if the flow had been brought to rest against the blade. The combination of very high (even supersonic) velocities and radical change in direction result in a very large change in momentum. Thus a large reaction force is exerted on the blade.

The combination of both types of action and the multiplying effects of the carefully directed gasses produce force levels not otherwise available with gasses at these pressures and temperatures.

Additionally, to extract even greater performance from the whole system energy is recovered on both the input and exhaust of the turbine loop of the power system. On the input side of the engine, heat is brought from the external source to the heat exchanger serving the turbine loop. This is done by circulating a heat transfer fluid from the heat source over to the heat exchanger. Obviously not all of the available heat in the stream of heat transfer fluid will be absorbed into the engine in a single pass through. If the fluid were discarded at that point, the heat not absorbed would be lost. The system employs a pump and a loop to recirculate the fluid back to the source, and thence back around to the engine. In this way the heat is not wasted, and is presented again and again to the engine and is ultimately nearly all used. Even the energy required to operate the pump is imparted to the flow, and thus captured and circulated around the process for eventual use.

On the exhaust side of the turbine loop, a similar process is employed. The heat not converted in the engine to electricity is gathered up in a heat exchanger, and passed over into a reclaiming loop. This reclaiming loop is essentially a heat pump, and is used to raise the temperature of the working fluid back up, and it is then presented to another heat exchanger. This heat exchanger in turn is used to inject the heat back into the primary loop of the engine, at an appropriate point. Even the energy used to run the compressor in the heat pump is captured in the working fluid, and is injected into the engine for use. The combination of recovery of heat, and reuse of heat, on both the input and the exhaust sides of the engine is extremely effective and makes far more power output available than would otherwise be the case, with a given heat source.

Alternatively, the loop that brings the external source of heat to the system can be directed to the reclaiming loop containing the heat pump system rather than to the turbine loop. The introduction of heat from the external heat source to the heat pump loop enables the utilization of waste heat in temperature ranges lower than the arrangement wherein the external heat source is in direct communication with the turbine loop. The utilization of relatively lower temperature waste heat greatly expands the areas of opportunity to recover waste heat that in practice is typically going unused.

Accordingly, it is an objective of the instant invention to operate a power system without a need for a dedicated source of combustion in order to operate.

It is a further objective of the instant invention to operate a power system on low temperature waste heat left over from power plant turbine condensers or air conditioning units.

It is a further objective of the instant invention to operate a power system on low temperature solar, or geothermal power.

It is yet another objective of the instant invention that is capable of efficiently utilizing low temperature heat sources and low pressure working fluids to generate substantial energy.

It is a still further objective of the invention to provide a highly efficient heat engine having one or more blades mounted on a rotating member that utilizes high velocity gas flow to apply force to the rotating member.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2A is a front view of the rotating member with mounting recesses for the blades.

FIG. 2B is a side view of the rotating member with the mounting recesses for the blades.

FIG. 3A is a top view of one of the blades.

FIG. 3B is a side view of one of the blades

DETAILED DESCRIPTION OF THE INVENTION

FIGS. 1 through 11 describe the heat engine. FIGS. 12 through 15 describe the complete thermodynamic system.

Figure 1:
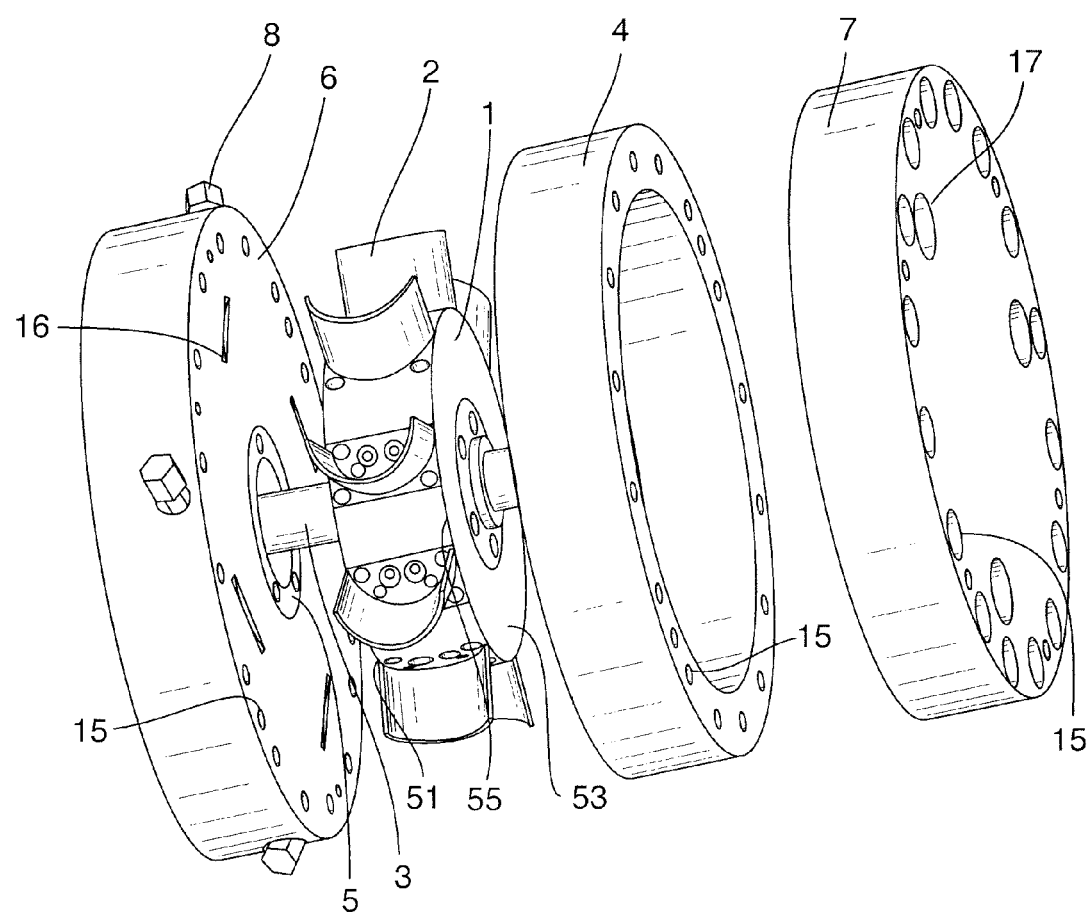
FIG. 1 is an exploded view of the core of the turbine showing the major components, including blades, nozzles, the rotating member, and the enclosure.

Beginning with the heat engine, FIG. 1 shows an exploded view of the heat engine components. As shown, the heat engine includes a left end bell 6, a right end bell 7, and a ring 4 that act together to enclose, seal, and support the engine. A rotating member 1 is mounted on a shaft 3, and the shaft 3 is supported by bearings 5 that are mounted in both left end bell 6 and right end bell 7. The shaft 3 is operatively connected to an electrical generator or other mechanical device to extract work from the rotating member 1. The left end housing includes inlet ports 16 each supporting a nozzle 8. The right hand bell 7 includes exhaust ports 17. While the invention is illustrated with four inlet nozzles, the number of inlet ports and corresponding nozzles can vary from one to many. The left end bell 6, the ring 4 and right end bell 7 are securely fastened together in a fluid tight relationship with a plurality of fasteners, such as bolts and nuts and seals (not shown). Bores 15 circumferentially spaced about the right and left end bells 6 and 7 and ring 4 are sized and configured to allow passage of each of the plurality of bolts, Mounted on the rotating member 1 are blades 2. It being understood that the numbers of blades and nozzles shown here are not the only quantities possible. For example these numbers could vary to increase the power output of the heat engine. Likewise, while bearings 5 are illustrated as ball bearings it should be understood that other types of bearings such as needle bearings, roller bearings, journal bearings, magnetic bearings and the like can be used as well. The rotating member 1 has a first planar surface 51 adjacent the left end bell 6 and a second planar surface 53 adjacent the right end bell 7. An outer peripheral surface 55 is contiguous with both the first and second planar surfaces. The blade 2 has a width approximately equal to the distance between the first and second planar surfaces and a height that extends outward from the outer peripheral surface 55.

FIGS. 2A, 2B, 3A and 3B show some additional details of the rotating member and blade attachment. Rotating member 1 has dovetail shaped mounting slots 9 into which the blades 2 may be slid from the side. Blades 2 have a wedge shaped base 10 with mounting holes 13 through which pins and bolts are installed thereby holding the blades in place once they are slid into place in the mounting slots 9. The combined effect is to prevent the blades from being slung away from the rotating member by the forces of rotation, and also to prevent the blades from moving side to side and thus rubbing on the side walls of the enclosure. Each blade 2 has a concave surface 12 on a first side surface of the blade and a convex surface 11 on a second side surface of the blade 2.

Figure 10A:
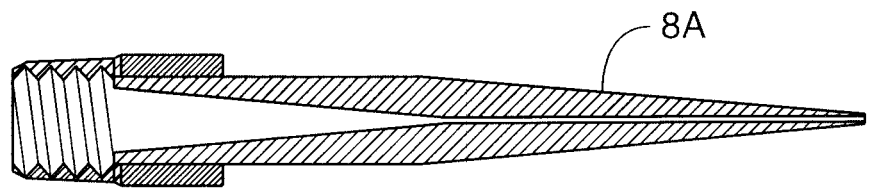
FIG. 10A is a cross sectional view of the converging nozzle.
Figure 11A:
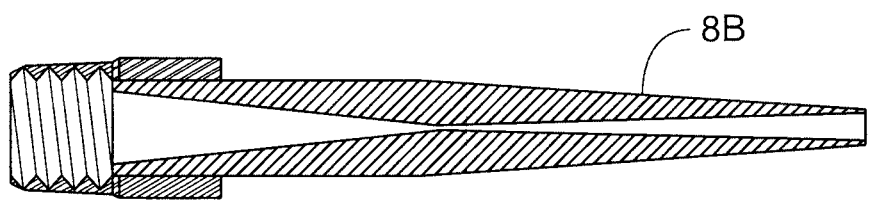
FIG. 11A is a cross sectional view of the converging-diverging nozzle.

In operation, the nozzles 8 direct high speed gasses at the concave surface 12 of each blade 2. The angle of the nozzles and the shape of the blades provide numerous advantages. FIGS. 10A and 11A show the nozzles in cross section. Gas enters from the left, and is passed through a converging nozzle, as in FIG. 10A, or a converging-diverging nozzle, as in FIG. 11A to achieve a very high gas velocity. The nozzles are each fastened and sealed within their respective inlet ports 16 to facilitate removal and replacement as desired. In addition, differing nozzle designs may be used to operate the engine in differing circumstances requiring changes to flow properties. The nozzles are formed as a long slender hollow body which acts to receive the working gases and deliver them to a precise location and flowing in a desired direction. A tapered tip at the exit of the nozzle places the exiting flow into the desired position in the immediate proximity of the blades 2 that are mounted on the rotating member 1.

The large total flow (mass) in combination with a very high gas flow velocity exiting these nozzles results in a very large momentum for the mass flow. This flow is significantly superior as a result, when compared to prior art engines.

Figure 8A:
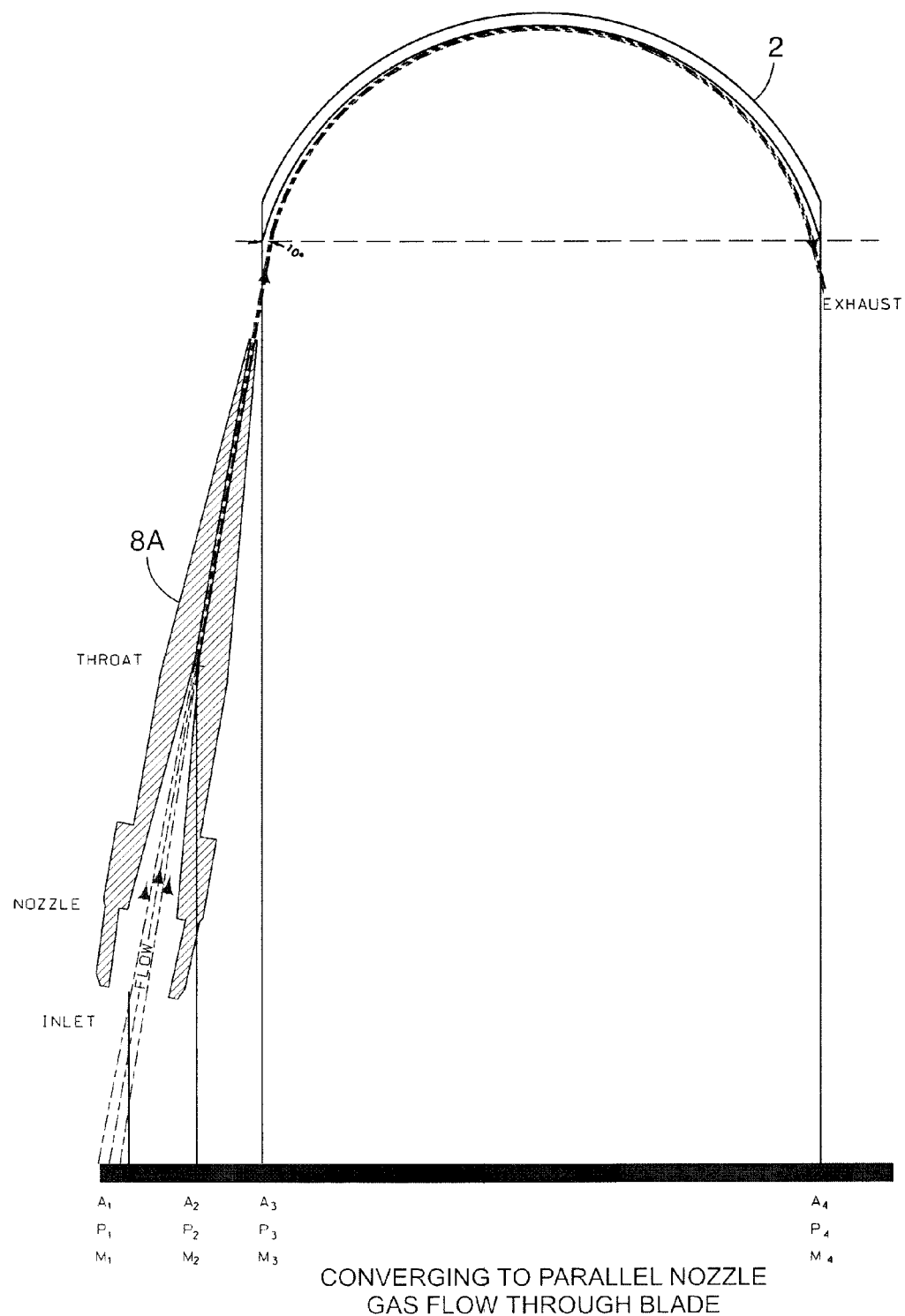
FIG. 8A shows a converging nozzle, aligned with a blade, and the resulting directions of flow.
Figure 8B:
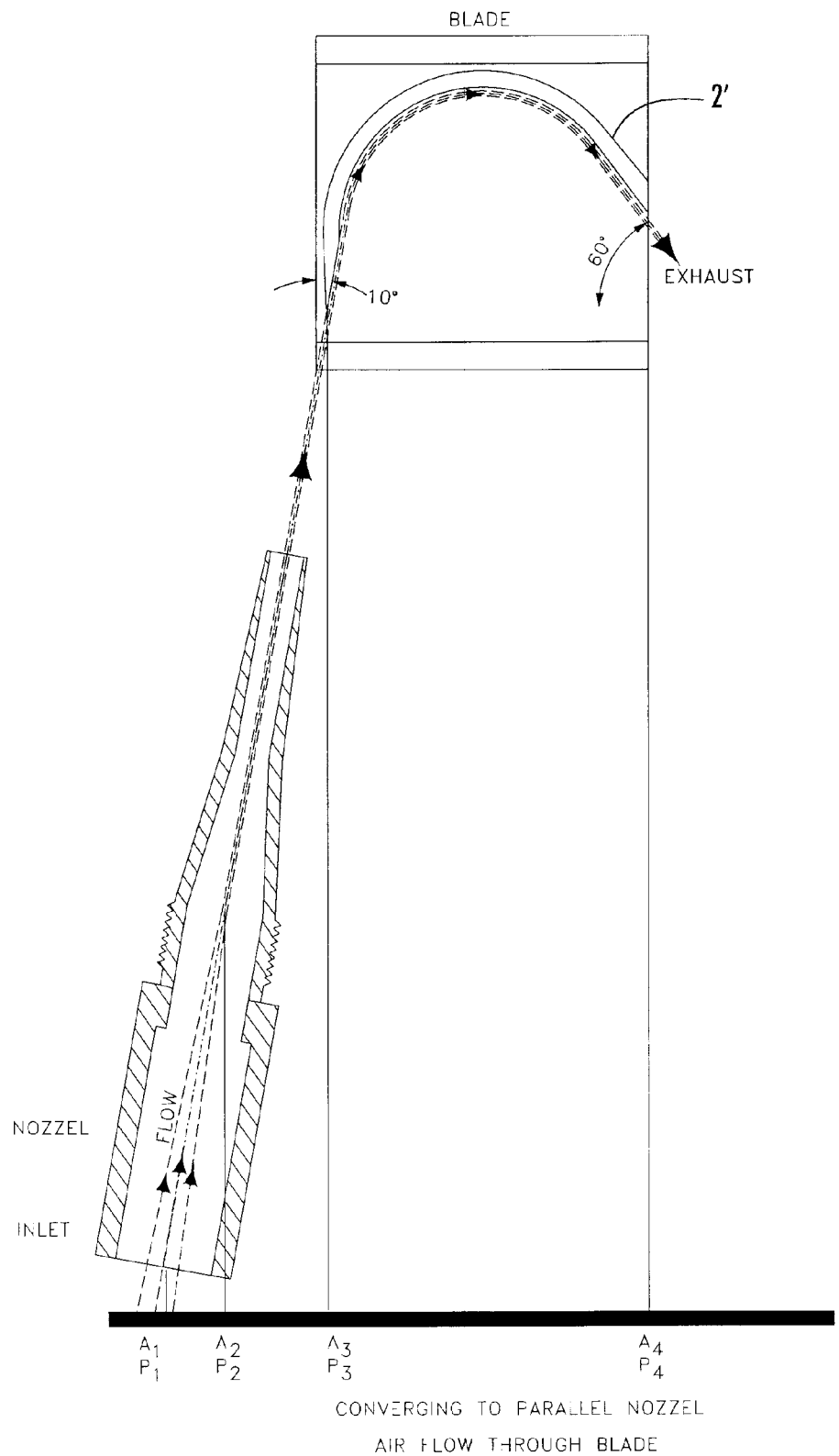
FIG. 8B shows a converging nozzle aligned with a blade having an alternative shape to that shown in FIG. 8A.
Figure 9:
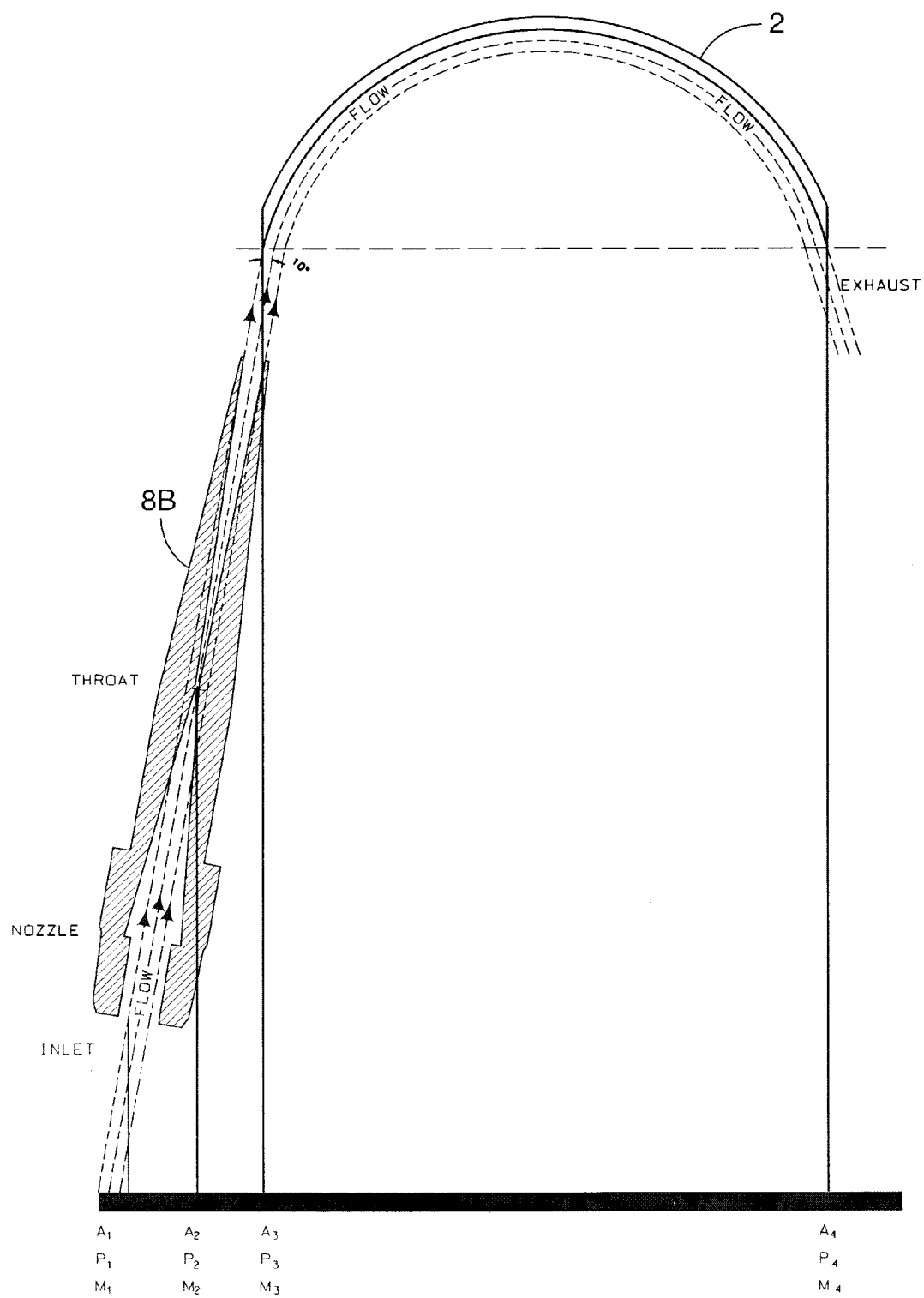
FIG. 9 shows a converging-diverging nozzle, aligned with a blade, and the resulting directions of flow.

FIGS. 8A, 8B, and 9 illustrate this flow directed against the blades. FIG. 8A shows one embodiment the blade 2 and FIG. 8B shows an alternative embodiment for the blade As shown, the gas flow is introduced at a very shallow angle (10 degrees shown as an example) between the flow inlet and the blade 2 and 2'. The flow enters as nearly straight on to the concave surface 12 the blade 2 as is practical in this design. As a result of the high velocity gas flow across the blade two significant forces are imparted to the blade and the rotating member upon which the blade is mounted. As the flow impacts the blade directly, the pressure on the upstream side, or concave surface 12, of the blade becomes greater than the pressure on the downstream or convex surface 11 of the blade. This creates a pressure differential (delta P) across the blade 2. This delta P, multiplied by the surface area of the blade, produces a force, which in turn imparts a rotational force to the rotating member 1. The second significant force is the result of the large momentum change. The flow enters nearly straight up, as shown in FIG. 8A, and exits nearly straight down, meaning that a nearly complete reversal (nearly 180 degrees) of the flow results. In the embodiment shown in FIG. 8B the flow enters the blade 2' nearly straight up and exits not quite straight down creating a reversal of flow of approximately 120 degrees. As shown in FIG. 8B the blade 2' has a downstream edge that directs the exhaust gas flow at a larger angle than blade 2 shown in FIG. 8A The configuration of the downstream edge of blade 2' will prevent a build up of excess backpressure in the turbine.

Since velocity, and thus momentum, are vector quantities, a momentum of "M" entering, becomes a momentum of almost "−M" coming out. This creates a momentum change of M−(−M)=2M overall. The precise value of course depends on the exact blade angle. This is a great improvement over the momentum change that would have resulted from merely bringing the flow to rest against the blade, or by passing it across a slightly curved blade, both being done in the prior art. The total force on each blade is the combined result of both of the above significant forces.

Figure 4:
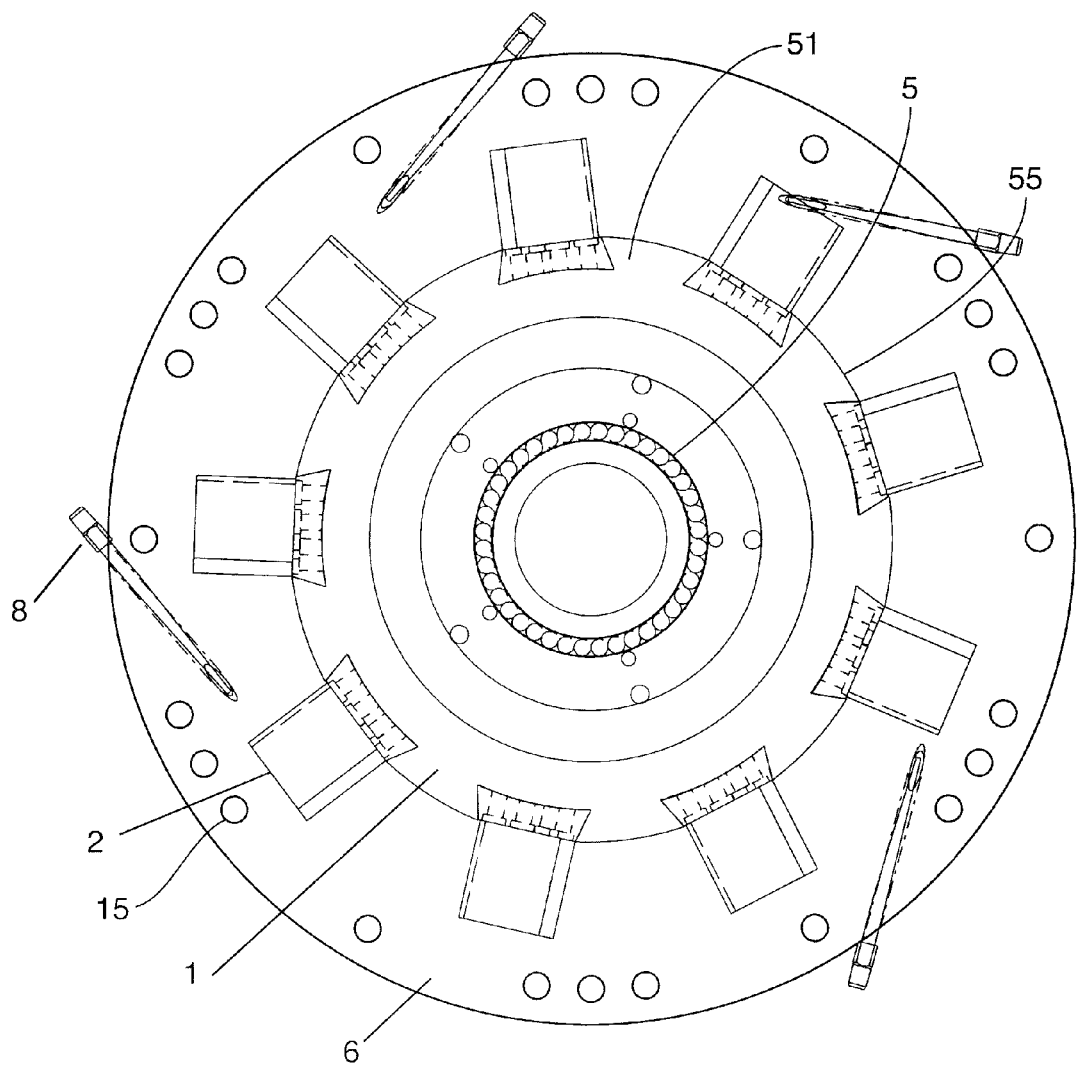
FIG. 4 shows one end plate, the rotating member, the blades and the nozzles superimposed so that their relationships can be seen.
Figure 5A:
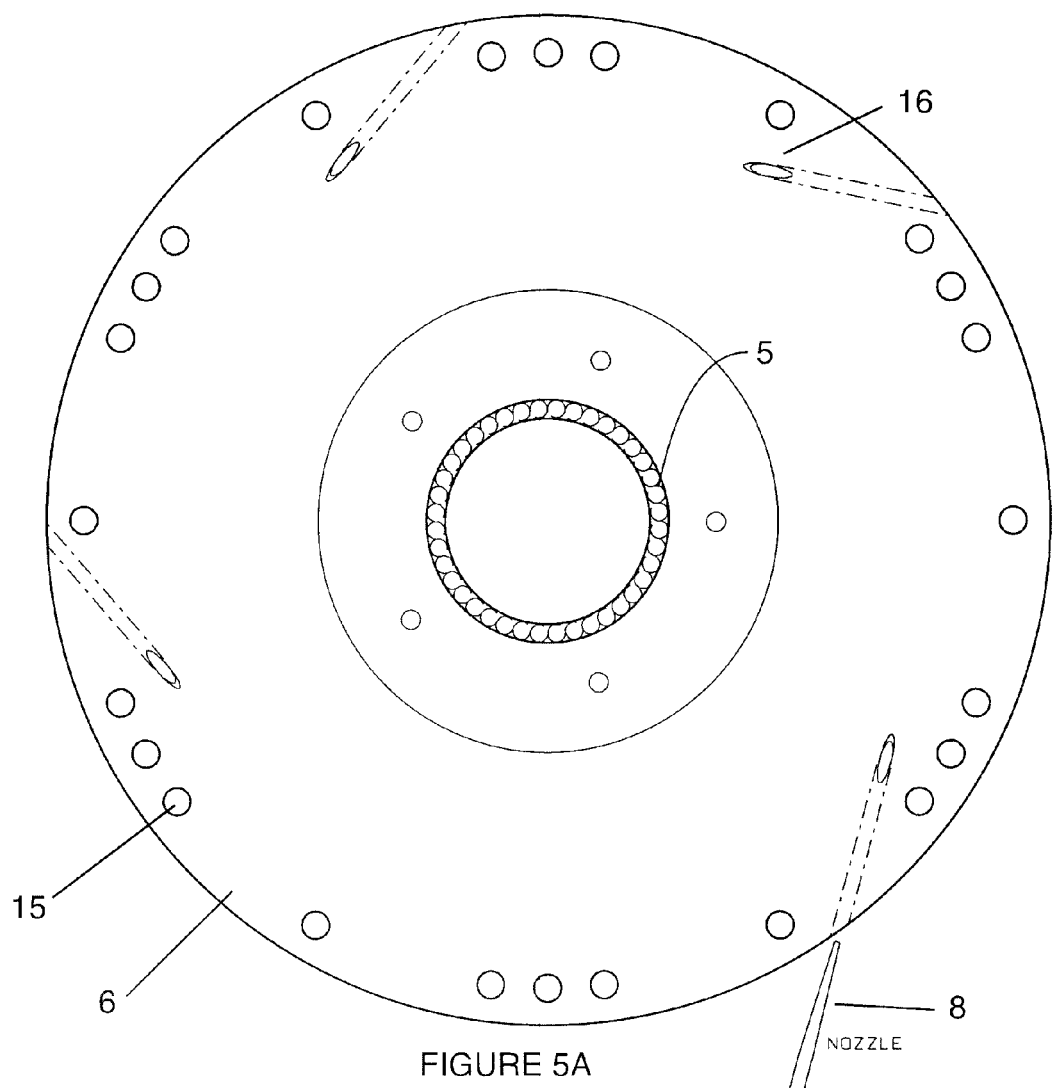
FIG. 5A shows one end plate with the nozzles and also the mounting and locating holes for the plate.
Figure 5B:
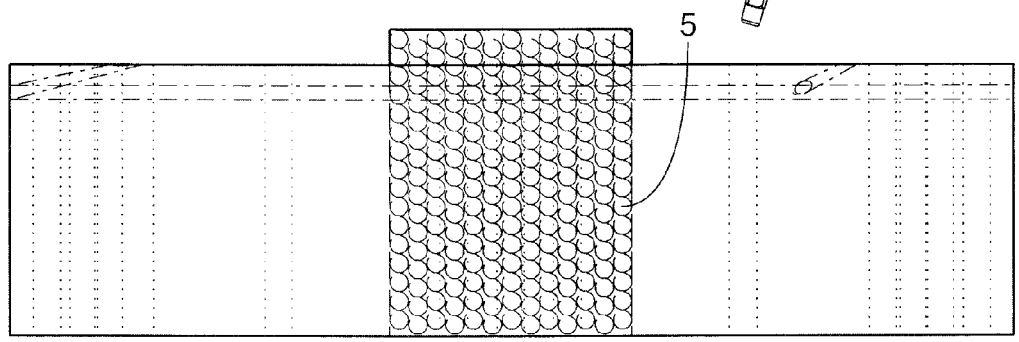
FIG. 5B is a top view of the device shown in FIG. 5A.
Figure 6A:
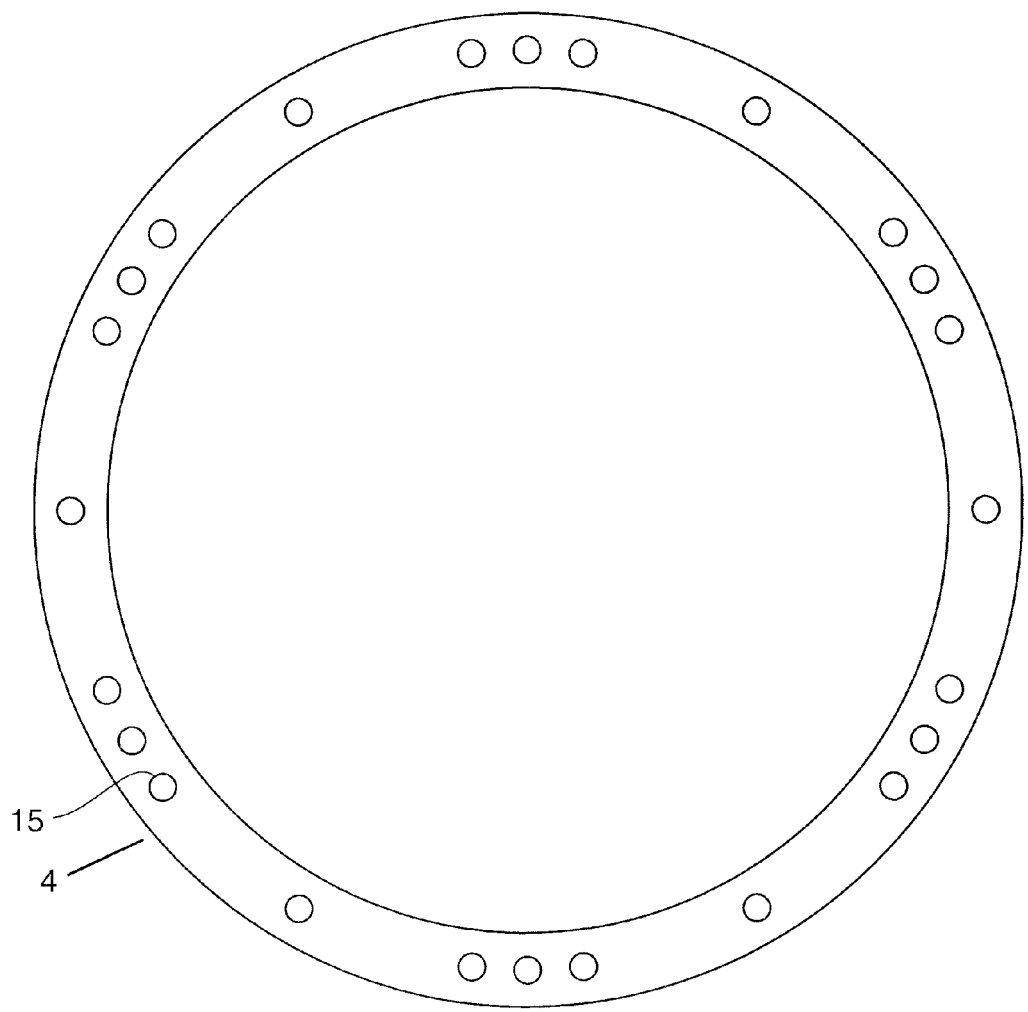
FIG. 6A is a front view of the center portion, or ring, of the enclosure.
Figure 6B:
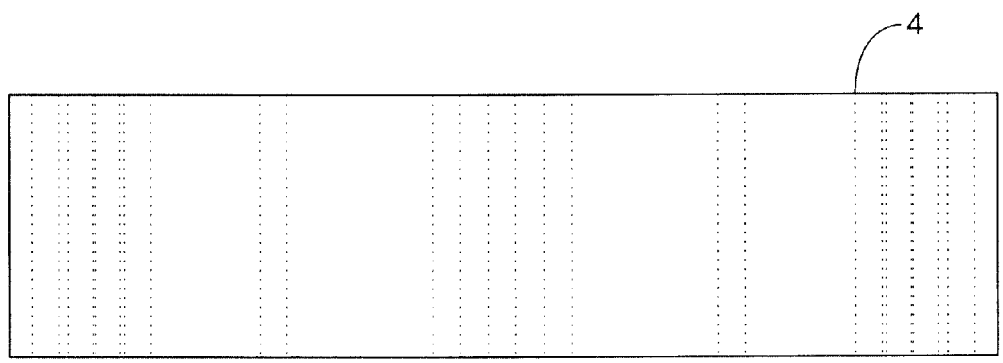
FIG. 6B is a top view of the center portion or ring shown in FIG. 6A
Figure 7A:
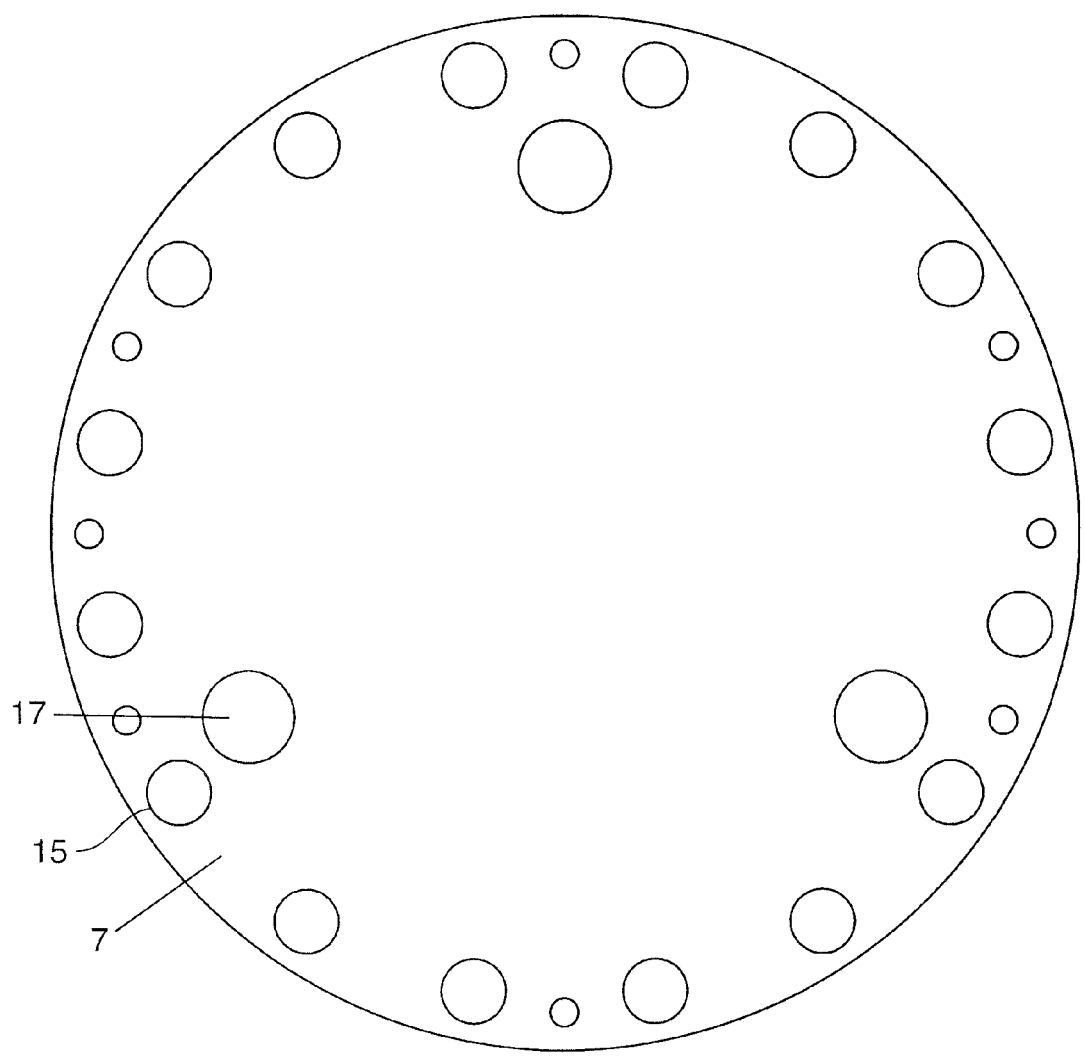
FIG. 7A is a front view of the opposite end plate with the exhaust ports.
Figure 7B:
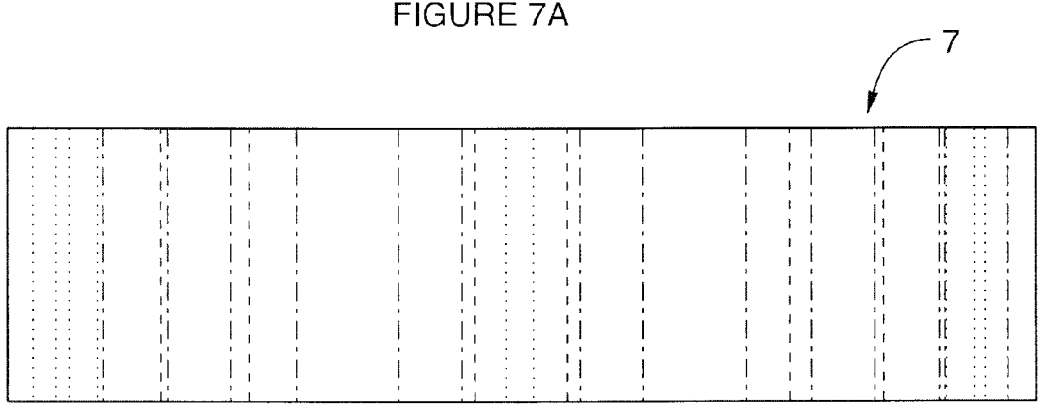
FIG. 7B is a top view of the opposite end plate with the exhaust ports.

FIG. 4 is a perspective view of the left end bell 6, the rotating member 1, the blades 2, and the nozzles 8, all superimposed in a single view.

The invention specifically provides a plurality of blades, and a plurality of nozzles, as shown in FIGS. 1 and 4 thereby creating multiple pulses of force to be applied to the rotating element 1 in parallel. An even larger number of force pulses are produced as the rotating member completes a full revolution. Providing multiple pulses in parallel, increases the torque available at a given instant. Providing multiple pulses per revolution increases the power produced per revolution. It is understood that one of ordinary skill in the art could alter the numbers of blades and nozzles, and thus the power available from an engine. The numbers shown are for illustration and are not limiting.

Figure 10B:
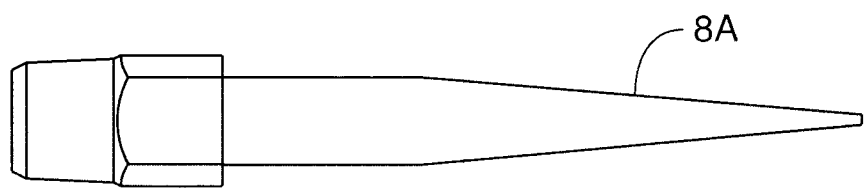
FIG. 10B is a perspective view of the nozzle of FIG. 10A

FIG. 10A is a cross sectional view of a converging nozzle 8A and FIG. 10B is a perspective view of the converging nozzle 8A.

Figure 11B:
FIG. 11B is a perspective view of the nozzle of FIG. 11A.

FIG. 11B is a cross sectional view of a converging-diverging nozzle 8B and FIG. 11B is a perspective view of the converging-diverging nozzle 8B.

It is understood that one of ordinary skill in the art could devise variations of these mounting features. The features shown illustrate the structures and are not limiting. It is also within the scope of this invention that a turbine having a larger diameter would produce more torque from the same pressure differential. Likewise a turbine having wider blades would result in increasing the reactive surface area thereby creating more force and torque than turbines having blades of smaller width. The heat exchangers utilized in the following systems can be of various types and numbers and it is contemplated that one skilled in the art would select the type and appropriate number of units to achieve the greatest operating efficiency.

We next examine the total thermodynamic system, as presented in FIGS. 12 through 15. These figures present optional configurations that are possible. Other variations of the basic configuration could be envisioned by one skilled in the art, and these figures are not limiting.

Figure 12:
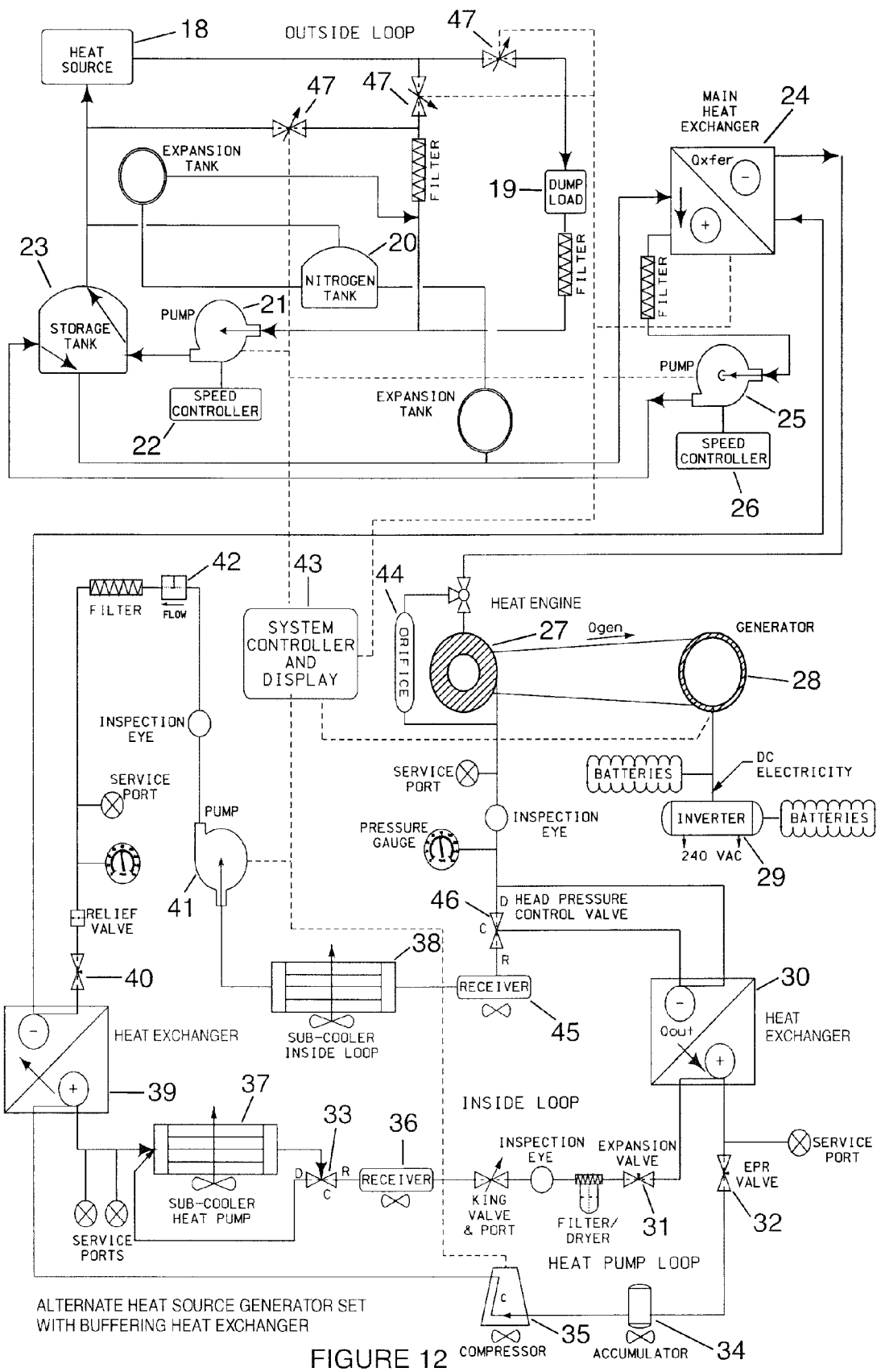
FIG. 12 shows a full system diagram, with a buffering heat exchanger on the input loop, and using a generalized source of waste heat. This would facilitate having a heat pump on the input side, if needed.

As shown in FIG. 12 there are 3 thermodynamic loops which make up the system. These are; the outside loop which brings heat from the source, the inside loop which runs the engine directly, and the heat pump loop, which recycles waste heat from the engine back into the system. We describe these in detail below.

The outside, or heat source loop, begins with heat source 18. This source may be any source of low temperature heat, including waste heat from any number of waste heat sources or solar and geothermal heat sources as well. In this embodiment, the external heat source may supply temperatures as low as 250° F. In the operational mode of this loop, heat from the source 18 is conveyed by a first heat transfer fluid around to pump 21. The first heat transfer fluid may be Paratherm NF®, or one of many commercial equivalents. The speed of pump 21 is controlled by control unit 22, to achieve desired pressures and flow rates. A relief valve may be incorporated into the loop to avoid the buildup of damaging excess pressure. The hot heat transfer fluid is then conveyed to heat storage tank 23, where it is held using a phase change material. This material in storage tank 23 changes phase from solid to liquid when heated to the desired temperature. The heat of fusion of such material being very large and capable of holding very large quantities of heat in a small volume. The stored heat may be used at a later time when the external heat source may become temporarily unavailable. Nitrogen tank 20 is used to hold an inert gas such as nitrogen in the tops of the expansion tanks to prevent suction pressures from falling too low and causing pump cavitations, and to prevent corrosion.

Once the desired amount of heat is stored, and the desired temperatures are reached, then secondary pump 25 is started. This pump circulates a second heat transfer fluid from the storage tank 23 over to the main heat exchanger 24. Secondary speed controller 26 controls pump 25 and maintains the desired pressures and flow rates. Heat which has thus been supplied to the main heat exchanger 24 is now available for use. Also provided are bypass valves 47 which permit bypassing the heat source around the main heat exchanger 24 when desired, and also permit bypassing the heat into dump load 19, under conditions where excess heat is present and must be discarded to the environment.

The inside, or turbine loop, functions in the following manner.

Heat from main heat exchanger 24 is conveyed by the inside, or turbine loop, heat transfer fluid, which is a refrigerant, to the heat engine 27. Heat engine 27 is constructed and operated in the manner disclosed in FIGS. 1 through 11. The refrigerant will operate at low temperatures of less than 300 deg F., and at pressures of less than 200 psig. In operation the heat transfer fluid within the turbine loop will condense at temperatures as low as 80 degrees F. and will boil at about 70 degrees F. when used in this heat engine. This heat engine 27 then operates, and conveys power to generator unit 28. The generator unit 28 produces electricity which is conducted to an inverter 29. The inverter 29 processes the power and makes it available for use externally. During warm-up, the refrigerant leaving heat exchanger 24 is bypassed around the heat engine through orifice 44. This allows the inside loop to warm up, without presenting hot has to a cold heat engine, which would condense and cause problems. A very small amount of hot gas is passed through the heat engine during this time, to bring it up to temperature without excessive condensing of gas to liquid.

After leaving the engine 27, the gaseous refrigerant passes into the heat exchanger 30, which serves to condense the gas back to a liquid. In the process, heat is released to the heat pump loop, to be discussed presently. On leaving heat exchanger 30, the inside loop refrigerant, now a liquid, passes through pressure control valve 46, which prevents the pressure from dropping too low which would destabilize the loop function. Pressure control valve 46 is only needed in those cases where the system might be mounted in a cool climate. In such a case, the pressure of the condensed liquid coming out of the condensers could drop too low. Without enough pressure present, the refrigerant will not circulate in sufficient quantities, as pressure is needed to force circulation. The head pressure control valve prevents this loss of pressure by reducing temporarily and automatically, the capacity of the condensers, keeping the pressure high. The refrigerant is then stored in the receiver 45, where it awaits further demand for circulation. Once further fluid is required, it departs the receiver 45 and makes its way through sub-cooler 38, where it is cooled just sufficiently to prevent premature formation of any gas bubbles in the liquid. The flow then continues on to pump 41. In addition to circulating the liquid around the loop, the pump acts to raise the pressure of the liquid to the level required for operation. Flow gauge 42 provides a measure of the rate of flow, which is controlled by the speed of the pump.

The high pressure liquid then proceeds to valve 40. This valve is normally on, but is closed when the engine is off, to prevent flooding of the downstream components.

On passing through valve 40 the flow reaches heat exchanger 39. Here it picks up reclaimed heat from the heat pump loop to be discussed presently. This raises the temperature of the liquid and causes it to boil and to form a gas. From here, the flow travels back to heat exchanger 24, where it receives the balance of the required heat, and the cycle begins again. The system actually reclaims so much heat that the majority of the heat required to operate the engine comes from heat exchanger 39. Only a small amount of heat is added on each pass around the loop from exchanger 24. This is central to the efficiency of the total system, and is totally unlike prior art engines.

We next describe the heat pump, or heat reclaiming, loop. Starting from receiver 36, liquid heat reclaiming transfer fluid, again a refrigerant, is supplied under pressure to expansion valve 31. Here the pressure is dropped sharply, in a controlled manner, and provided to heat exchanger 30. In this process, the refrigerant begins to boil, and becomes a very cold gas. This cold gas extracts heat from the inside loop, through heat exchanger 30, and carries away this heat to be reclaimed. The cold gas now travels to pressure control valve 32, where the drop in pressure is regulated. Pressure control valve 32 is considered to be optional and is intended to prevent the evaporators in the system from becoming too cold. In practice this seldom happens. The gas pressure is kept high enough that the gas temperature does not drop to a temperature lower than that which is desired. From there, the gas travels to accumulator 34 where any liquid drops inadvertently remaining are held temporarily, thus preventing them from reaching and damaging the compressor.

The flow, still a cold gas, then travels to compressor 35. While various types of compressors can be utilized it should be recognized that one skilled in the art would select the type and appropriate number of units to achieve the greatest operating efficiency. For example a multi unit scroll type compressor could be used. Here the gas is greatly compressed, reaching much higher levels of pressure and temperature. The flow then travels to heat exchanger 39, where the temperature is now high enough so that the heat may be efficiently reinjected into the inside, or turbine loop process. Thus the heat has been reclaimed, along with the heat resulting from the compression work done by the compressor.

In the process of passing through heat exchanger 39, the heat pump loop refrigerant gas cools sufficiently that it recondenses to a liquid once again. It then passes through sub-cooler 37 which condenses any remaining liquid and slightly sub-cools the liquid. It then passes through pressure control valve 33 which prevents the pressure from dropping too low and destabilizing the loop function, and then finally returns to receiver 36, where the heat pump loop process begins again. A filter/dryer element is utilized to remove stray particles and also stray moisture from the loop thereby preventing all components from icing, damage and corrosion.

Additionally, system controller and display 43 is provided. This provides automatic control of the entire system, using software created for this purpose. It will be appreciated that a system of this complexity can only be operated in the field under automatic control.

Figure 13:
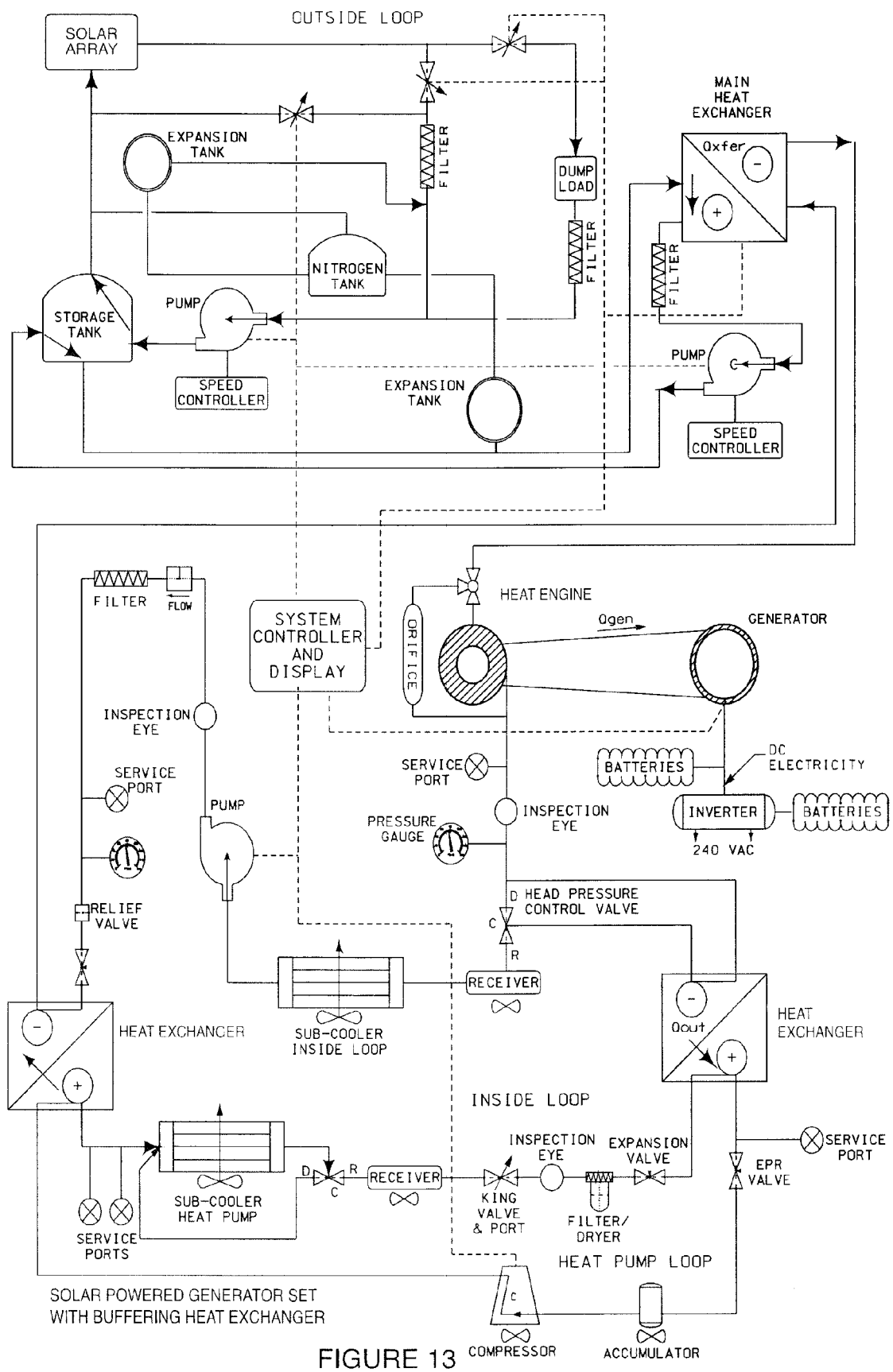
FIG. 13 shows a full system diagram, with a buffering heat exchanger on the input loop, and using a solar array as a source of heat. This would facilitate having a heat pump on the input side, if needed.

FIG. 13 is a diagrammatic representation of the power system shown in FIG. 12 with a buffering heat exchanger on the input loop, substituting a solar array as a source of heat. This would facilitate having a heat pump on the input side, if needed.

Figure 14:
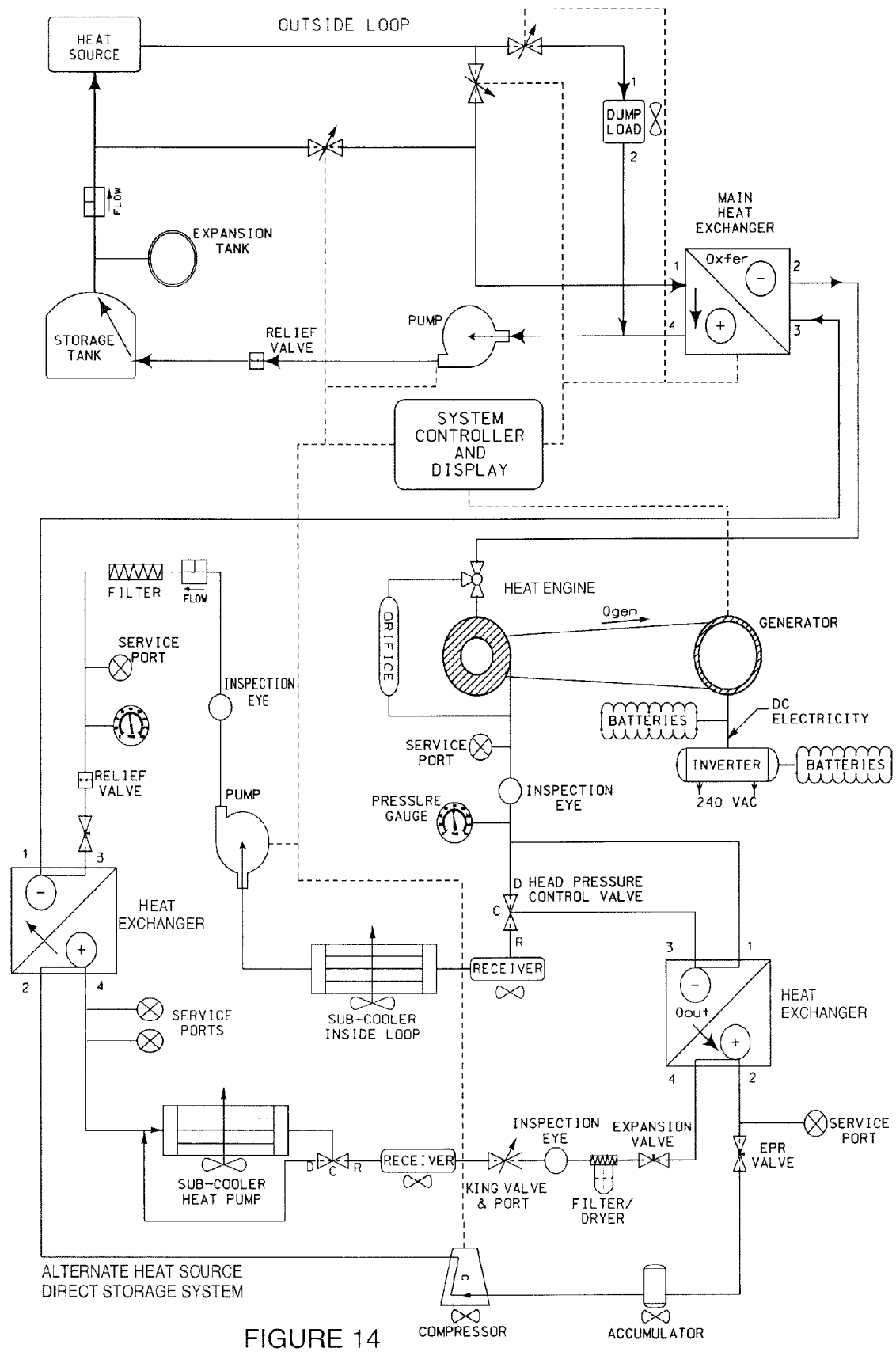
FIG. 14 shows a full system diagram, without a buffering heat exchanger on the input loop, and using a generalized source of waste heat.

FIG. 14 is a diagrammatic representation of the power system described in FIG. 12 however in this instance without a buffering heat exchanger on the input loop, and using a generalized source of waste heat.

Figure 15:
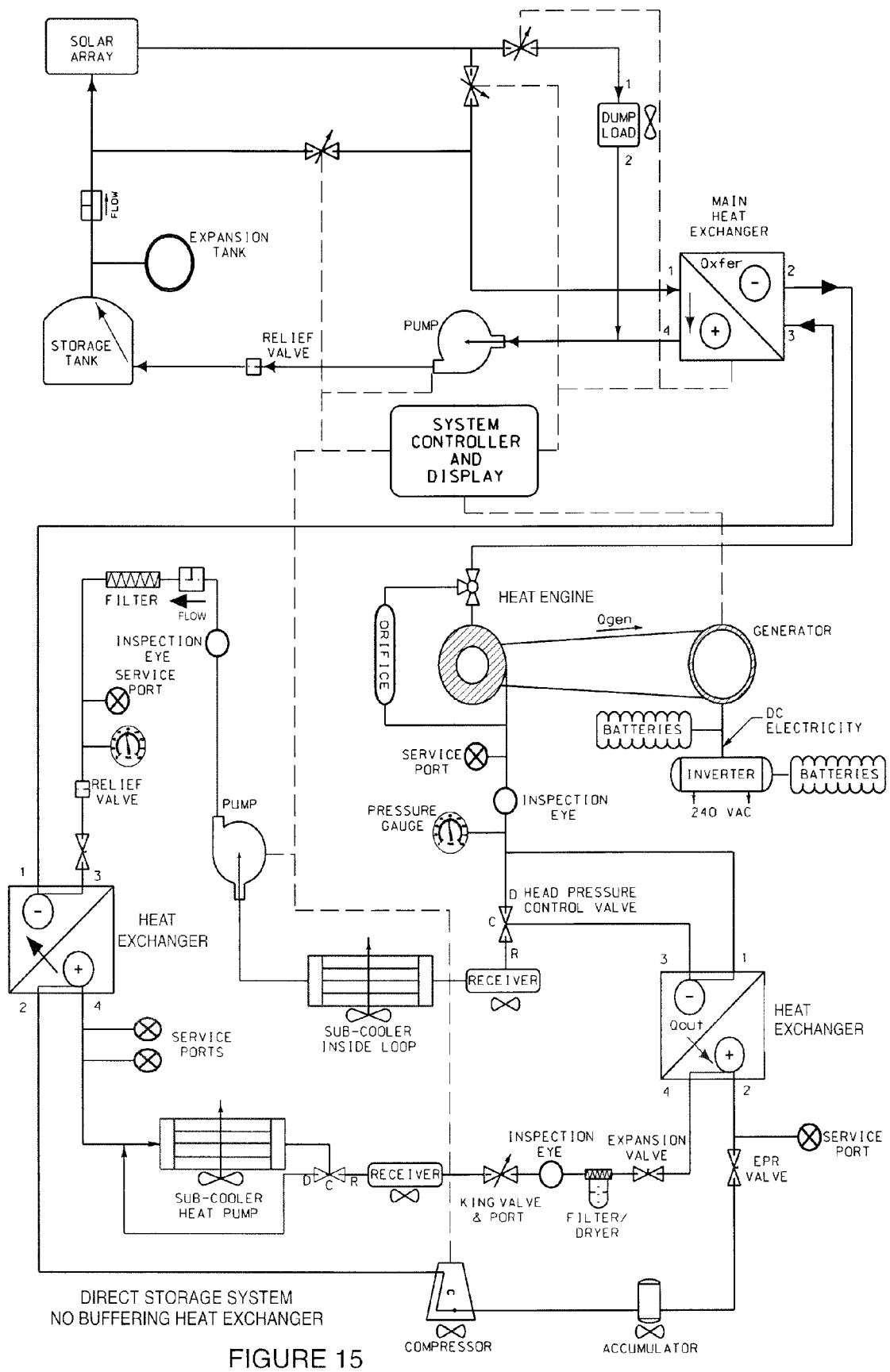
FIG. 15 shows a full system diagram, without a buffering heat exchanger on the input loop, and using a solar array as a source of heat.

FIG. 15 is a system similar to that shown in FIG. 14 without a buffering heat exchanger on the input loop, and substituting a solar array as a source of heat.

As shown in FIG. 16 through 19 there are 3 thermodynamic loops which make up an alternative embodiment of the power system. These are; the outside loop which brings heat from the source, the inside loop which runs the engine directly, and the heat pump loop, which recycles waste heat from the engine back into the system. In this embodiment the heat from the outside loop is directed to the heat pump loop rather than the turbine loop as in the previous embodiment thereby making it possible to use waste of lesser temperature than that used in the previous embodiment. Theoretically it is possible to use waste heat having a temperature as low as approximately 50 degrees F. however the volume of flow input heat would be very large in order to capture enough BTU's/hour, which might make the apparatus impractically large. It has been found the waste heat generated from conventional air conditioning units which produce waste heat of approximately 150 degrees F. are particularly well suited for this system. Likewise, waste heat from power plant turbine condensers which produce waste heat in the 120 degree F. range would also be particularly well suited for this system.

The system shown in FIGS. 16 through 19 shares most of the same components of the system as shown and described in the system illustrated in FIGS. 12 through 15.

The outside, or heat source loop, begins with heat source 18. This source may be any source of low temperature heat, including waste heat from any number of waste heat sources such as air conditioning units or power plant turbine condensers. The external heat source may supply temperatures as low as 50° F., but would preferably supply temperatures within the range of 120 to 150 degrees F. In the operational mode of this loop, heat from the source 18 is conveyed by a first heat transfer fluid around to pump 21. The first heat transfer fluid may be Paratherm NF®, or one of many commercial equivalents. The speed of pump 21 is controlled by control unit 22, to achieve desired pressures and flow rates. A relief valve may be incorporated into the loop to avoid the buildup of damaging excess pressure. The hot heat transfer fluid is then conveyed to heat storage tank 23, where it is held using a phase change material. This material in storage tank 23 changes phase from solid to liquid when heated to the desired temperature. The heat of fusion of such material is very large and capable of holding very large quantities of heat in a small volume. The stored heat may be used at a later time when the external heat source may become temporarily unavailable. Nitrogen tank 20 is used to hold an inert gas such as nitrogen in the tops of the expansion tanks to prevent suction pressures from falling too low and causing pump cavitations, and to prevent corrosion.

Once the desired amount of heat is stored, and the desired temperatures are reached, then secondary pump 25 is started. This pump circulates a second heat transfer fluid from the storage tank 23 over to the main heat exchanger 24. Secondary speed controller 26 controls pump 25 and maintains the desired pressures and flow rates. Heat which has thus been supplied to the main heat exchanger 24 is now available for use. Also provided are bypass valves 47 which permit bypassing the heat source around the main heat exchanger 24 when desired, and also permit bypassing the heat into dump load 19, under conditions where excess heat is present and must be discarded to the environment.

The inside, or turbine loop, functions in the following manner.

Heat engine 27 is constructed and operated in the manner disclosed in FIGS. 1 through 11. The refrigerant will operate at low temperatures of less than 300 deg F., and at pressures of less than 200 psig. In operation the heat transfer fluid within the turbine loop will condense at temperatures as low as 80 degrees F. and will boil at about 70 degrees F. when used in this heat engine. This heat engine 27 then operates, and conveys power to generator unit 28. The generator unit 28 produces electricity which is conducted to an inverter 29. The inverter 29 processes the power and makes it available for use externally. During warm-up, the refrigerant leaving heat exchanger 24 is bypassed around the heat engine through orifice 44. This allows the inside loop to warm up, without presenting hot gas to a cold heat engine, which would condense and cause problems.

After leaving the engine 27, the gaseous refrigerant passes into the heat exchanger 30, which serves to condense the gas back to a liquid. In the process, heat is released to the heat pump loop, to be discussed presently. On leaving heat exchanger 30, the inside loop refrigerant, now a liquid, passes through pressure control valve 46, which prevents the pressure from dropping too low which would destabilize the loop function. Pressure control valve 46 is only needed in those cases where the system might be mounted in a cool climate. In such a case, the pressure of the condensed liquid coming out of the condensers could drop too low. Without enough pressure present, the refrigerant will not circulate in sufficient quantities, as pressure is needed to force circulation. The head pressure control valve prevents this loss of pressure by reducing temporarily and automatically, the capacity of the condensers, keeping the pressure high. The refrigerant is then stored in the receiver 45, where it awaits further demand for circulation. Once further fluid is required, it departs the receiver 45 and makes its way through sub-cooler 38, where it is cooled just sufficiently to prevent premature formation of any gas bubbles in the liquid. The flow then continues on to pump 41. In addition to circulating the liquid around the loop, the pump acts to raise up the pressure of the liquid to the level required for operation. Flow gauge 42 provides a measure of the rate of flow, which is controlled by the speed of the pump.

The high pressure liquid then proceeds to valve 40. This valve is normally on, but is closed when the engine is off, to prevent flooding of the downstream components.

On passing through valve 40 the flow reaches heat exchanger 39. Here it picks up reclaimed heat from the heat pump loop and the outside or external heat loop, as will be discussed. This raises the temperature of the liquid and causes it to boil and to form a gas. From here, the flow travels to the heat engine 27. Located immediately downstream of the heat engine 27 is a de-superheater 54. The function of de-superheater 54 is to dispose of excess heat present in the turbine exhaust. Inside the turbine, enthalpy is converted to mechanical work. However, not all of the enthalpy can be effectively converted to work within the turbine and therefore a considerable amount of enthalpy will be left in the exhaust. If all of the enthalpy was transferred to the heat pump loop for recycling it would overwhelm the capacity of the heat pump. If the heat pump were made powerful enough to avoid being overwhelmed, the heat pump itself would then consume more energy than can be produced. The de-superheater 54 will dump this excess enthalpy to the environment using an air cooled heat exchanger. The de-superheater 54 does not condense the hot gas into a liquid but merely removes some excess energy from the hot gas. The system actually reclaims much of the heat and this is central to the efficiency of the total system, and is totally unlike prior art engines.

We next describe the heat pump, or heat reclaiming, loop.

Starting from receiver 36, liquid heat reclaiming transfer fluid, again a refrigerant, is supplied under pressure to expansion valve 31. Here the pressure is dropped sharply, in a controlled manner, and provided to heat exchanger 30. In this process, the refrigerant begins to boil, and becomes a very cold gas. This cold gas extracts heat from the inside loop, through heat exchanger 30, and carries away this heat to be reclaimed. The cold gas now travels to pressure control valve 32, where the drop in pressure is regulated. Pressure control valve 32 and other valves designated as EPR valve are considered to be optional and are intended to prevent the evaporators in the system from becoming too cold. In practice this seldom happens. At this point the heat reclaiming fluid that has passed through heat exchanger 24 and is conveyed through line 50 into the flow. The heat from the external loop is added to the heat pump loop at this point. The gas pressure is kept high enough that the gas temperature does not drop to a temperature lower than that which is desired. From there, the gas travels to accumulator 34 where any liquid drops inadvertently remaining are held temporarily, thus preventing them from reaching and damaging the compressor.

The flow then travels to compressor 35. Here the gas is greatly compressed, reaching much higher levels of pressure and temperature. The flow then travels to heat exchanger 39, where the temperature is now high enough so that the heat may be efficiently reinjected into the inside, or turbine loop process. Thus the heat reclaiming loop contains the heat from the turbine loop that has been reclaimed, the heat from the external loop along with the heat resulting from the compression work done by the compressor.

In the process of passing through heat exchanger 39, the heat pump loop refrigerant gas cools sufficiently that it recondenses to a liquid once again. Preferably, located immediately downstream of the heat exchanger 39 is a water cooled condenser 56 that is used only during the start-up and adjustment phases of the operation of the system. The water cooled condenser 56 provides a condensing function for the hot gas in the heat pump loop during such times (e.g. start up) when the main condenser has not yet ramped up to its intended capacity. If the water cooled condenser 56 were not present, hot gas could fail to fully condense, resulting in a breakdown of the heat pump loop function. Under certain parameters it is possible that water cooled condenser 56 may be considered to be optional. The heat pump refrigerant is then passed through sub-cooler 37 which condenses any remaining liquid and slightly sub-cools the liquid. It then passes through pressure control valve 33 which prevents the pressure from dropping too low and destabilizing the loop function, and then finally returns to receiver 36, where the heat pump loop process begins again. A return line 52 connected upstream of expansion valve 31 will convey a portion of the refrigerant to heat exchanger 24. A filter/dryer element is utilized to remove stray particles and also stray moisture from the loop thereby preventing all components from icing, damage and corrosion.

Additionally, system controller and display 43 is provided. This provides automatic control of the entire system, using software created for this purpose. It will be appreciated that a system of this complexity can only be operated in the field under automatic control.

Figure 16:
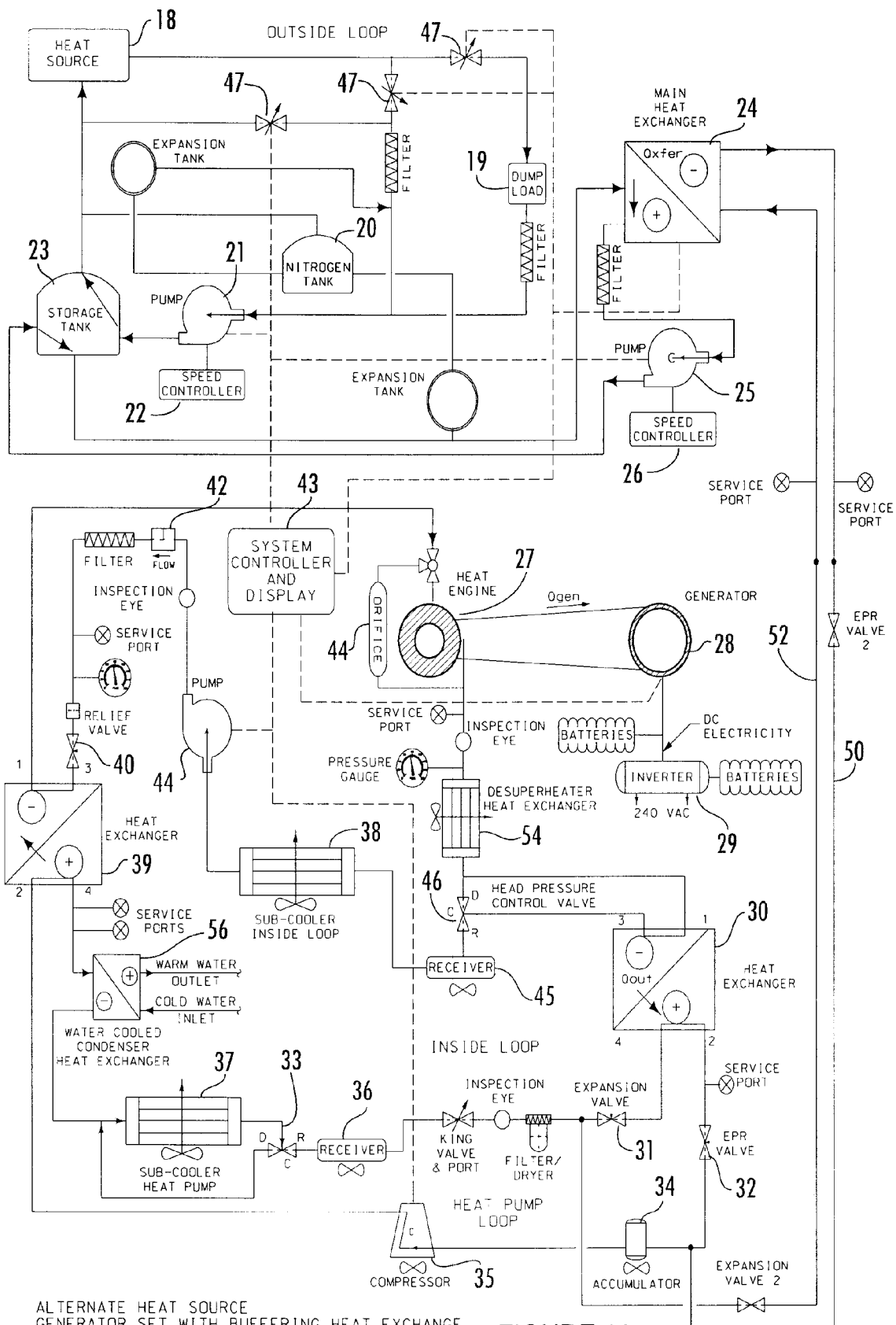
FIG. 16 illustrates an alternative embodiment of the full system diagram shown in FIG. 12 wherein the external heat loop is in indirect heat exchange relationship with the heat pump loop.
Figure 17:
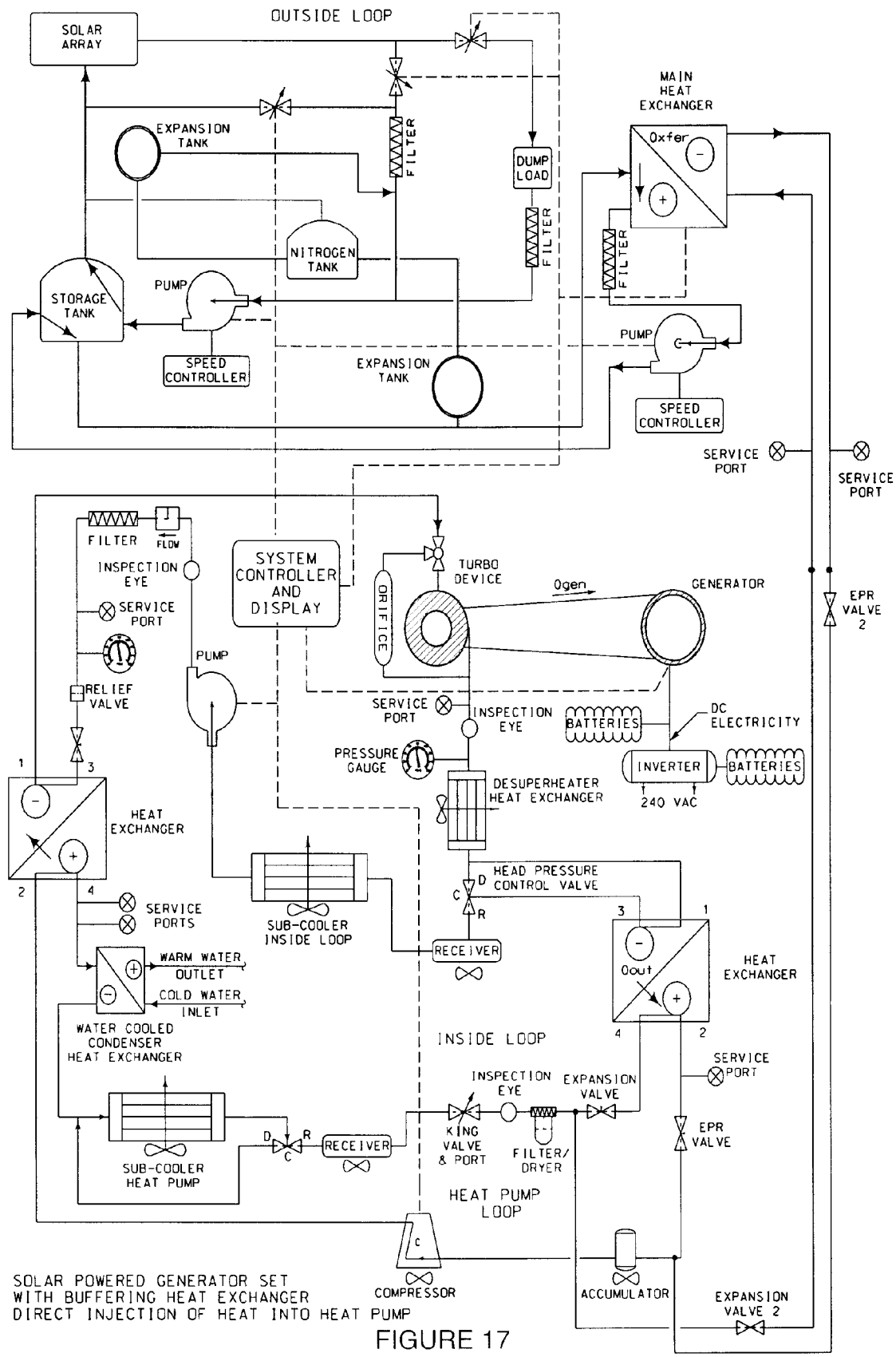
FIG. 17 illustrates an alternative embodiment of the full system diagram shown in FIG. 13 wherein the external heat loop is in indirect heat exchange relationship with the heat pump loop.

FIG. 17 is a diagrammatic representation of the power system shown in FIG. 16 with a buffering heat exchanger on the input loop, substituting a solar array as a source of heat. This would facilitate having a heat pump on the input side, if needed.

Figure 18:
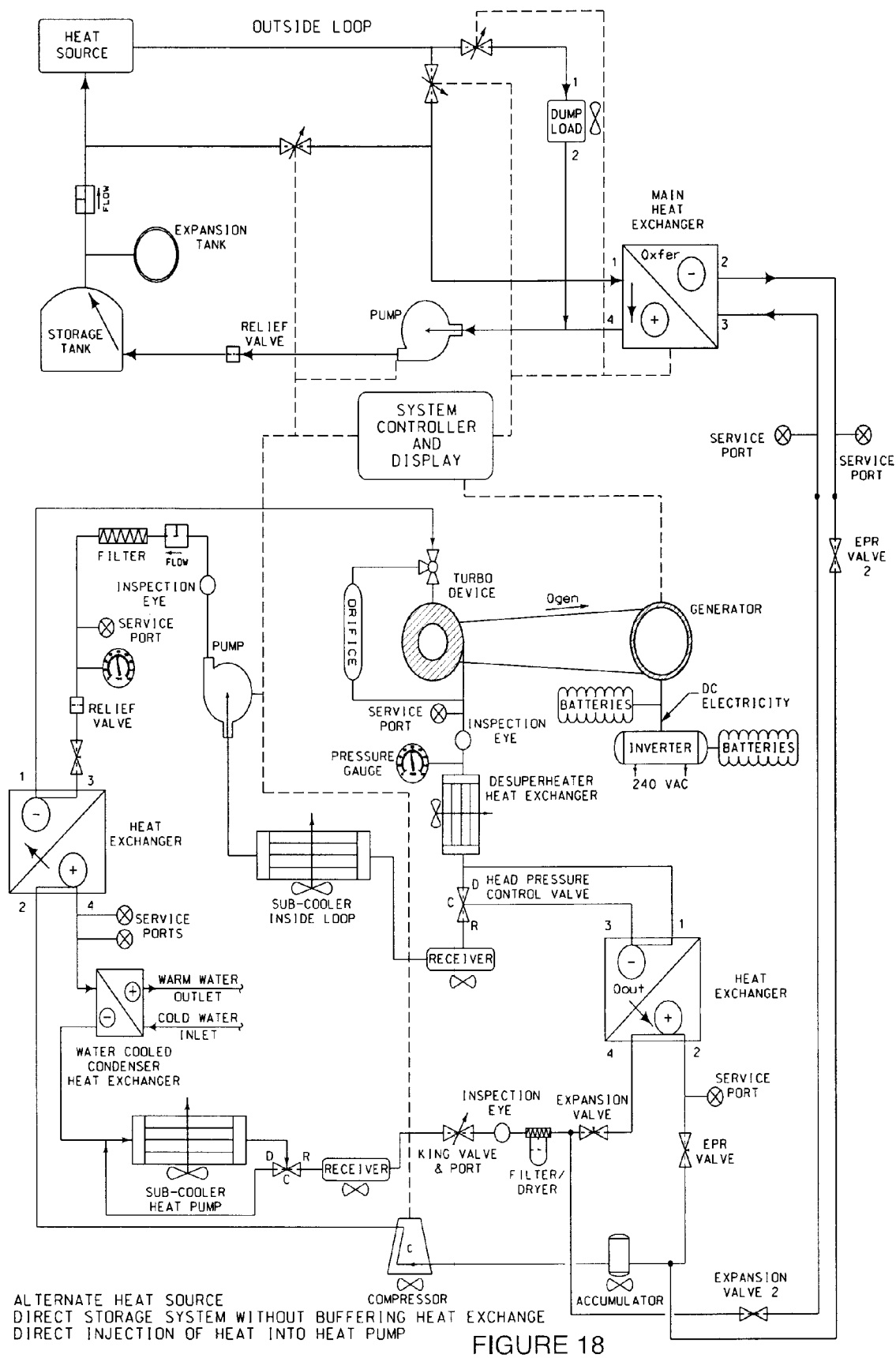
FIG. 18 illustrates an alternative embodiment of the full system shown in FIG. 14 wherein the external heat loop is in indirect heat exchange relationship with the heat pump loop.

FIG. 18 is a diagrammatic representation of the power system described in FIG. 16 however in this instance without a buffering heat exchanger on the input loop, and using a generalized source of waste heat.

Figure 19:
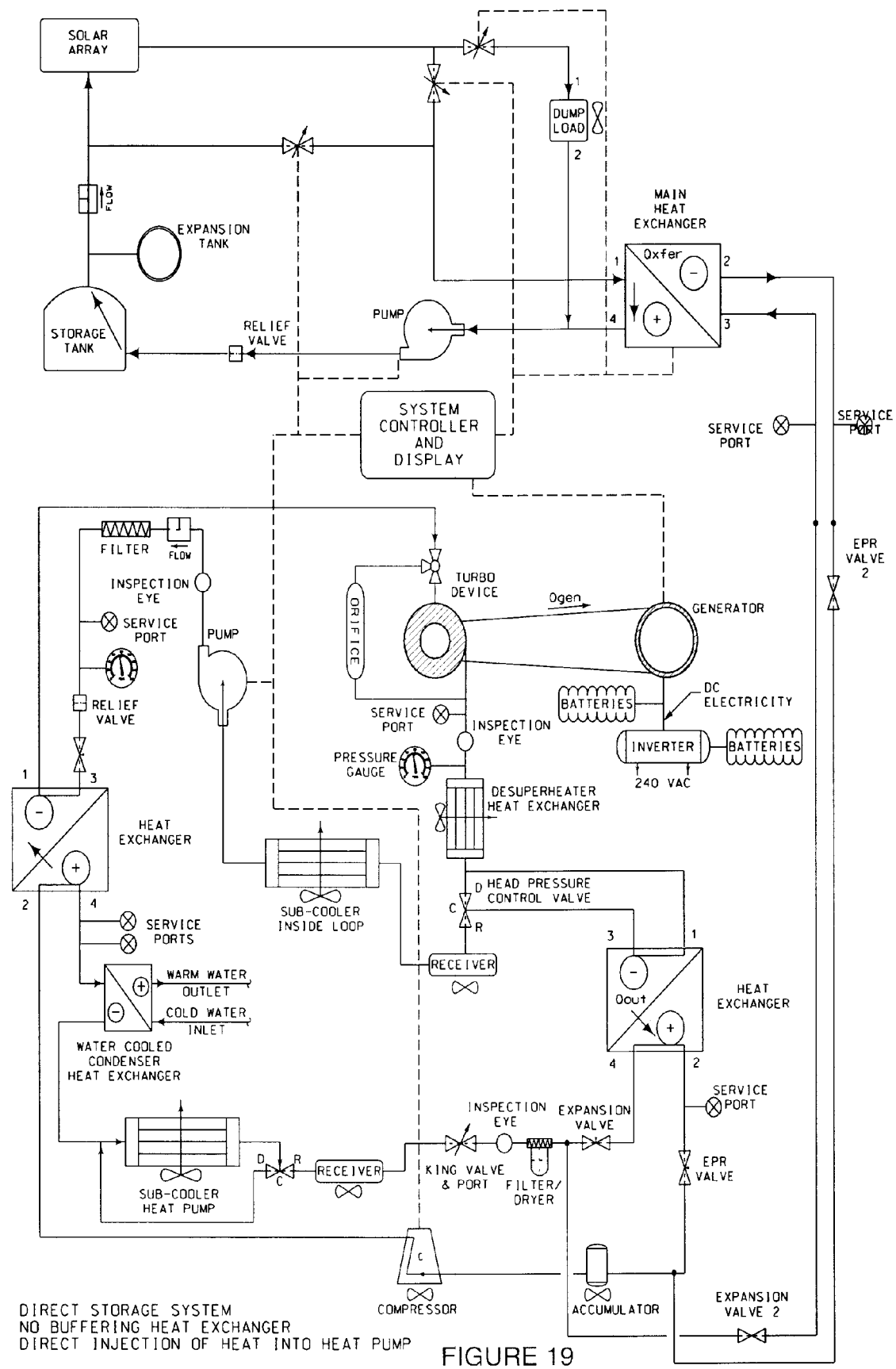
FIG. 19 illustrates an alternative embodiment of the full system shown in FIG. 15 wherein the external heat loop is in indirect heat exchange relationship with the heat pump loop.
Figure 20:
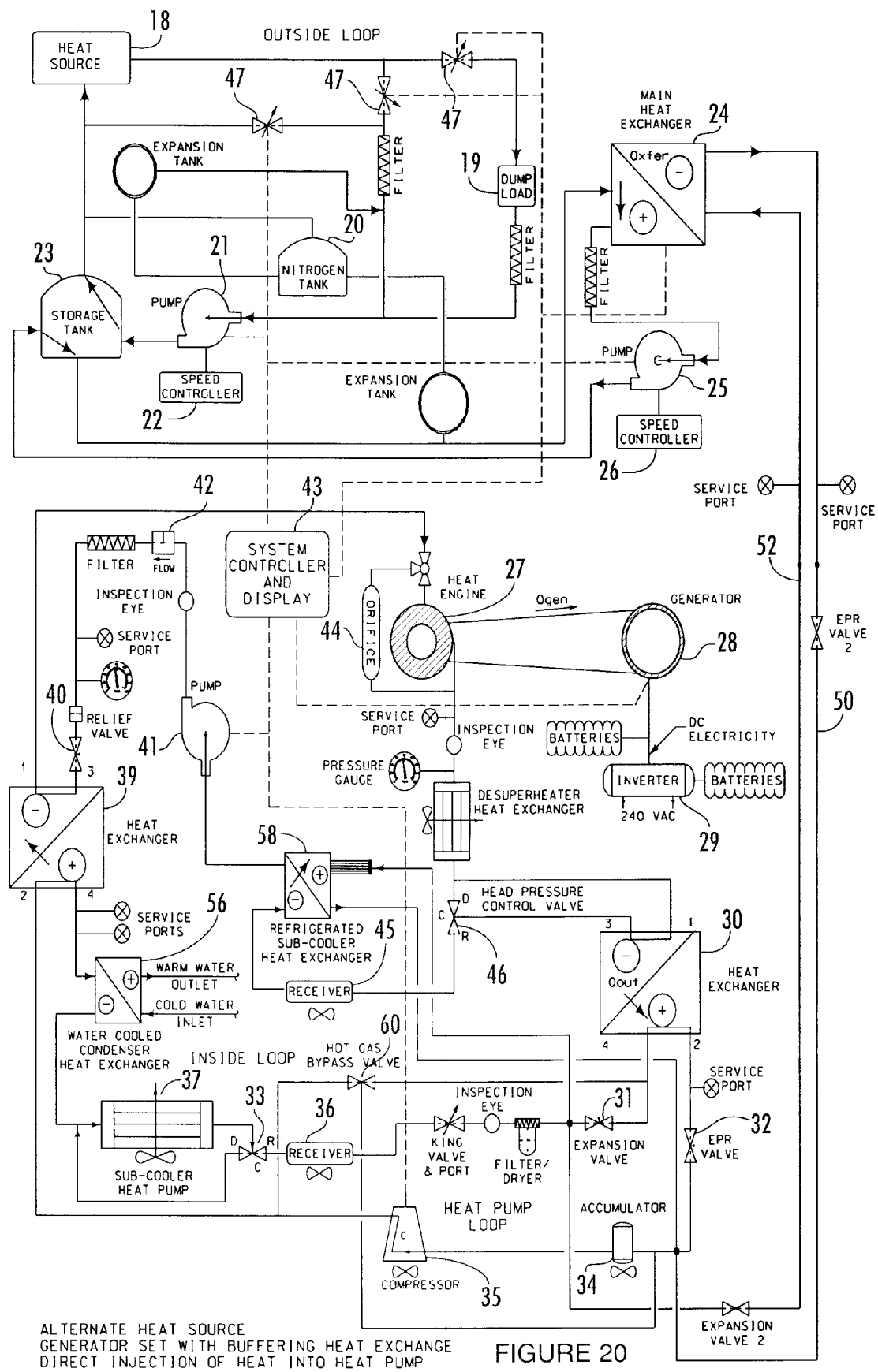
FIG. 20 illustrates the full system similar to that shown in FIG. 16 but with an alternative form of sub-cooler in the turbine loop.
Figure 21:
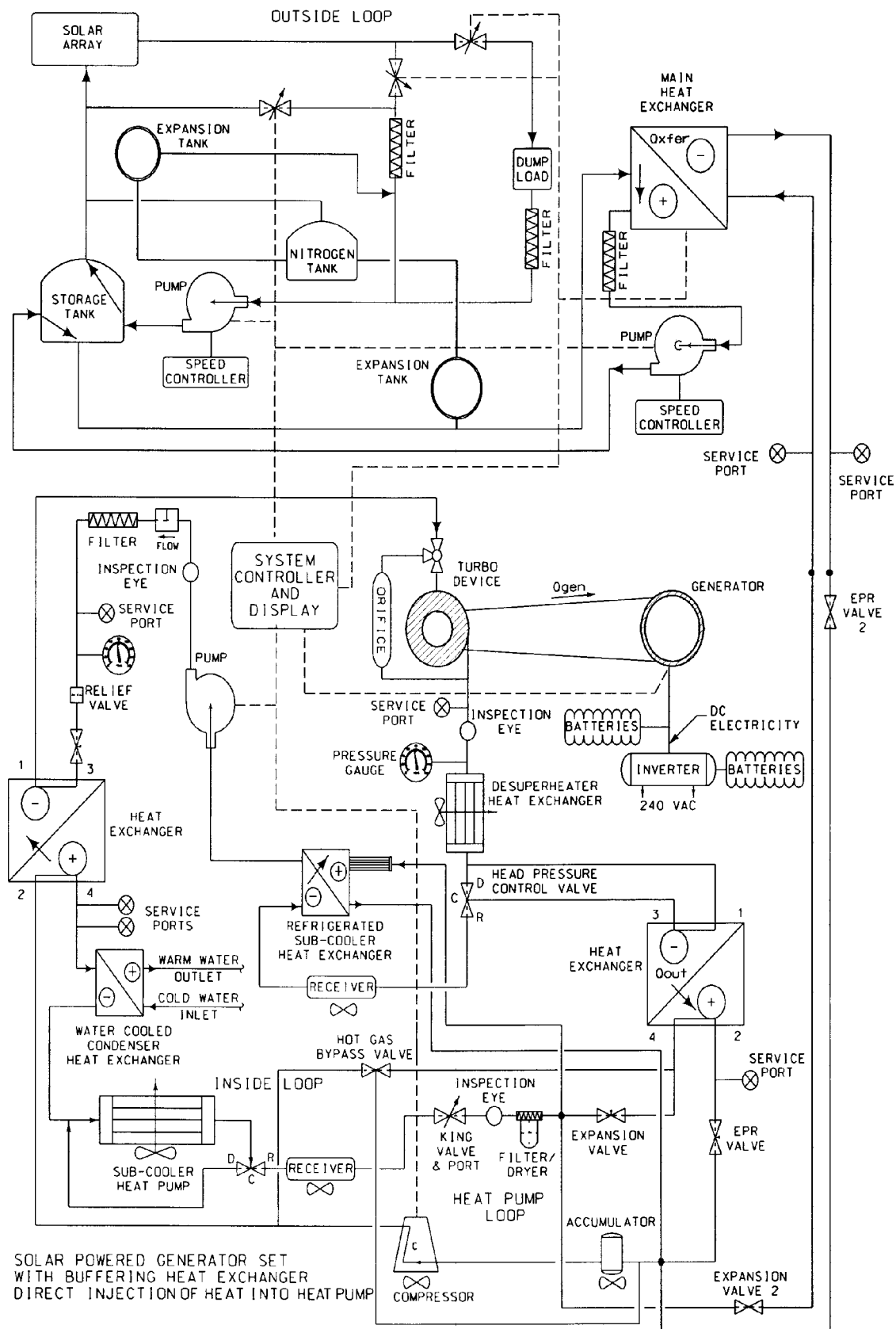
FIG. 21 illustrates the full system similar to that shown in FIG. 17 but with an alternative form of sub-cooler in the turbine loop.
Figure 22:
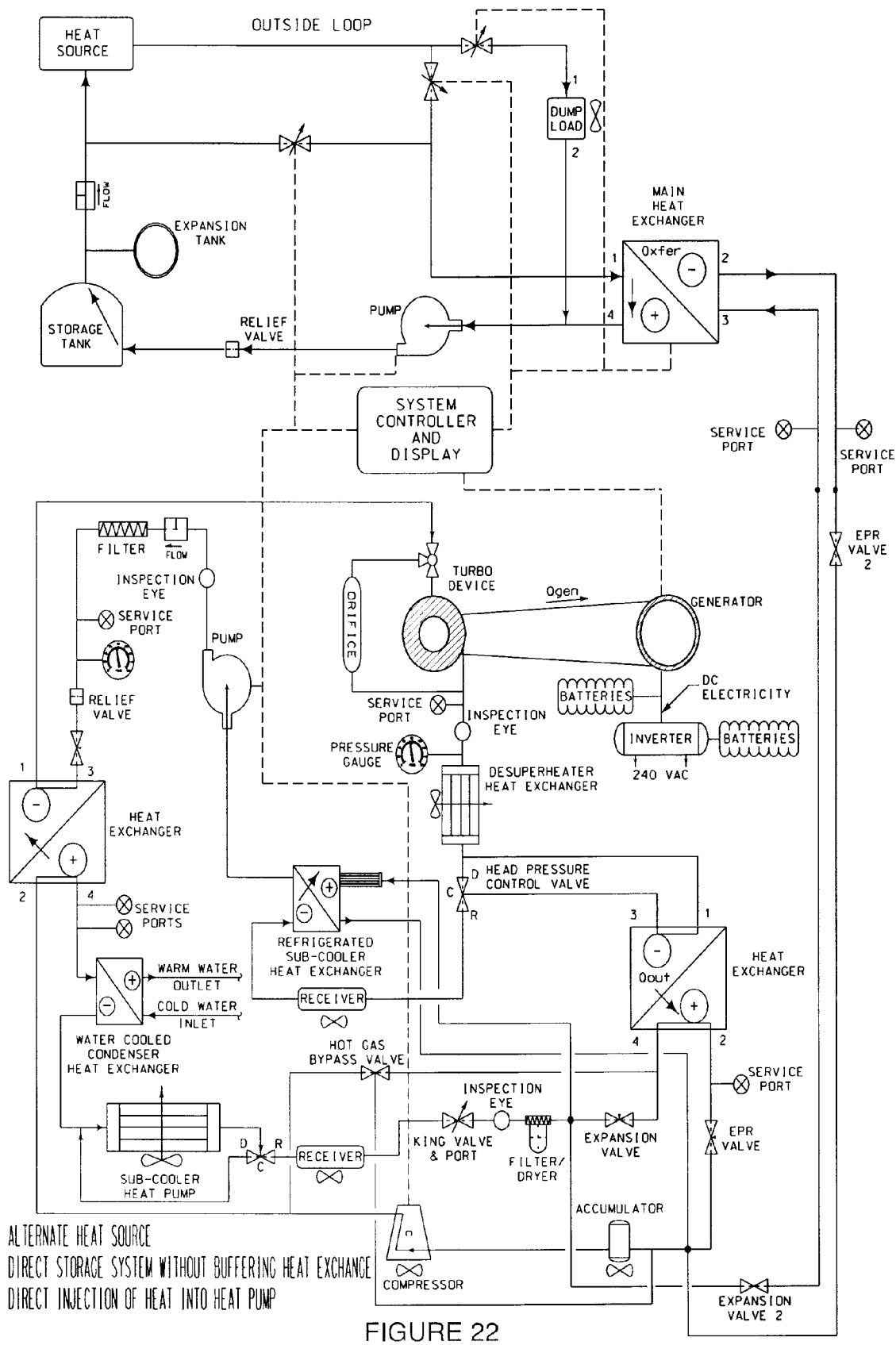
FIG. 22 illustrates the full system similar to that shown in FIG. 18 but with an alternative form of sub-cooler in the turbine loop.
Figure 23:
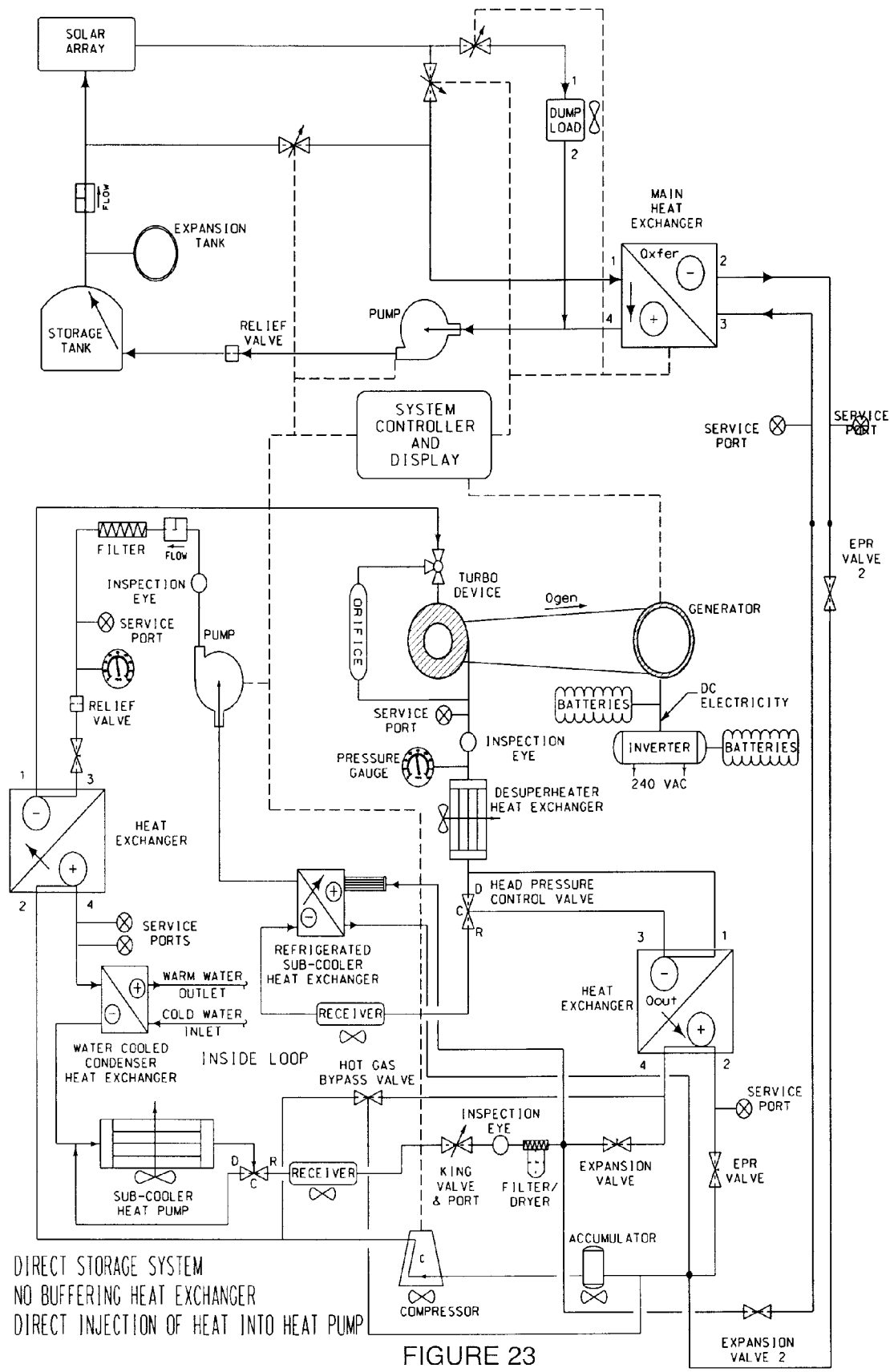
FIG. 23 illustrates the full system similar to that shown in FIG. 19 but with an alternative form of sub-cooler in the turbine loop.
Figure 24:
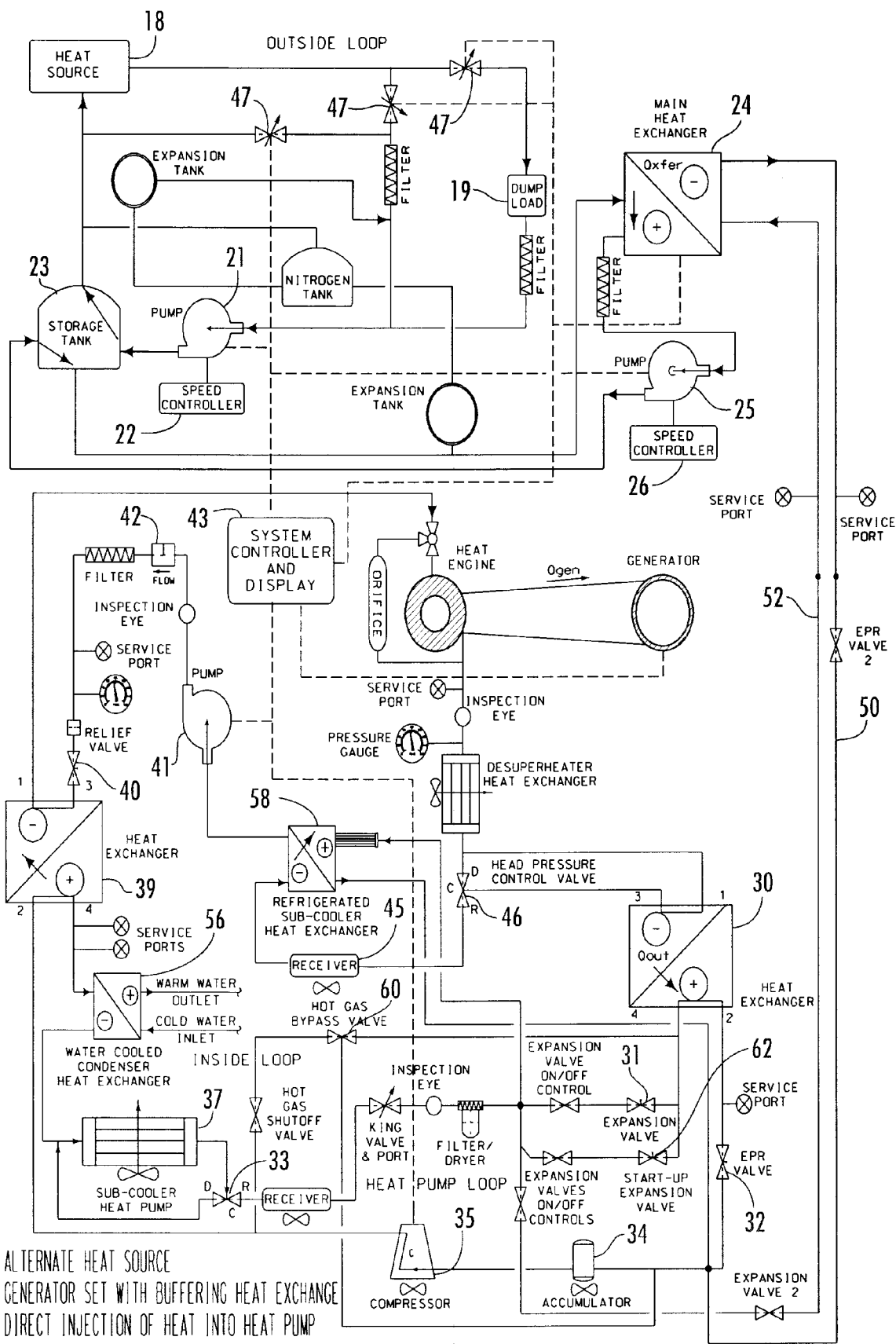
FIG. 24 illustrates the full system similar to that shown in FIG. 20 but further including a hot gas bypass and shutoff valve, auxiliary expansion valves for start up, as well as an alternative form of electrical power generation.
Figure 25:
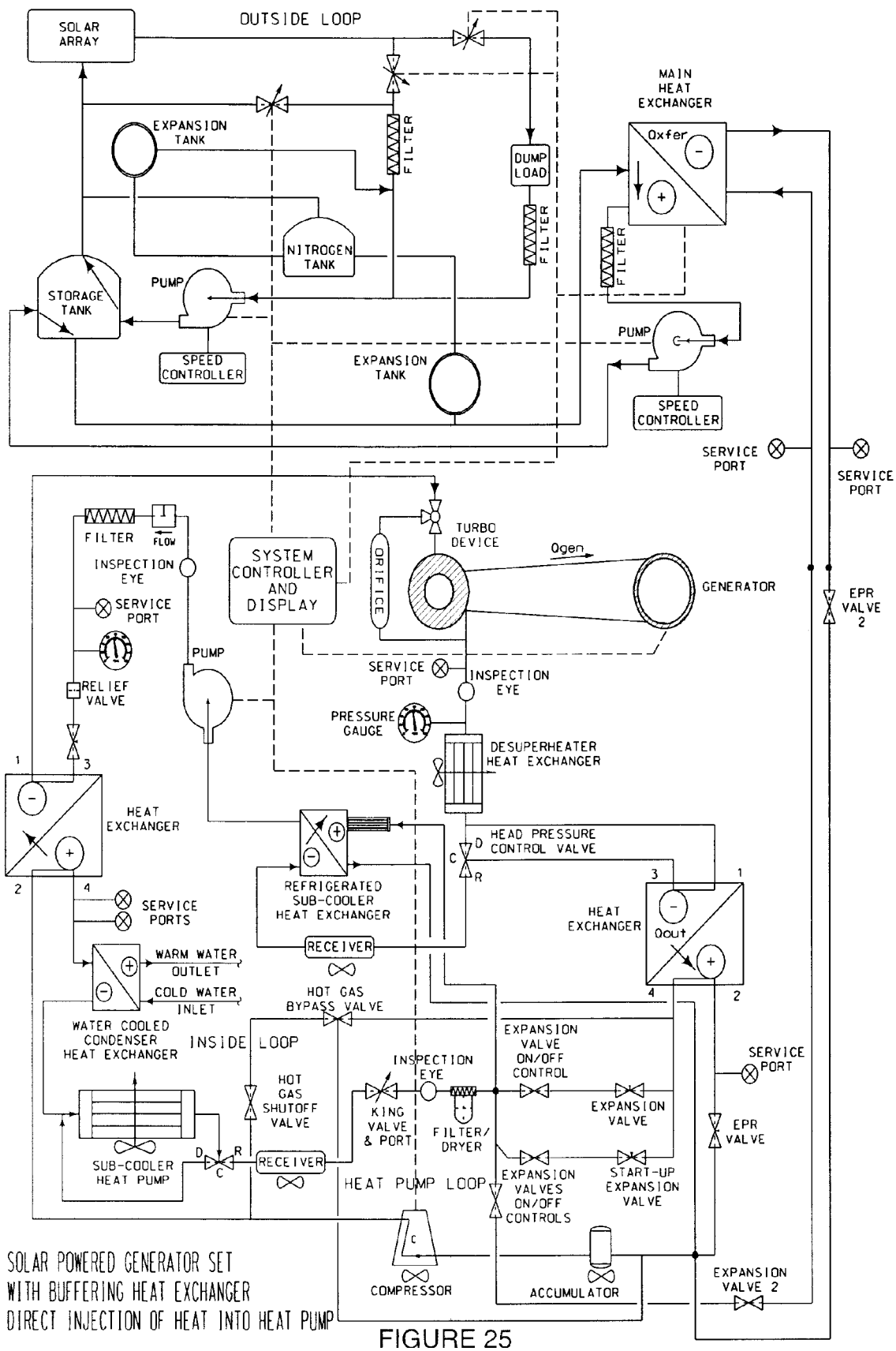
FIG. 25 illustrates the full system similar to that shown in FIG. 21 but further including a hot gas bypass and shutoff valve, auxiliary expansion valves for start up, as well as an alternative form of electrical power generation.
Figure 26:
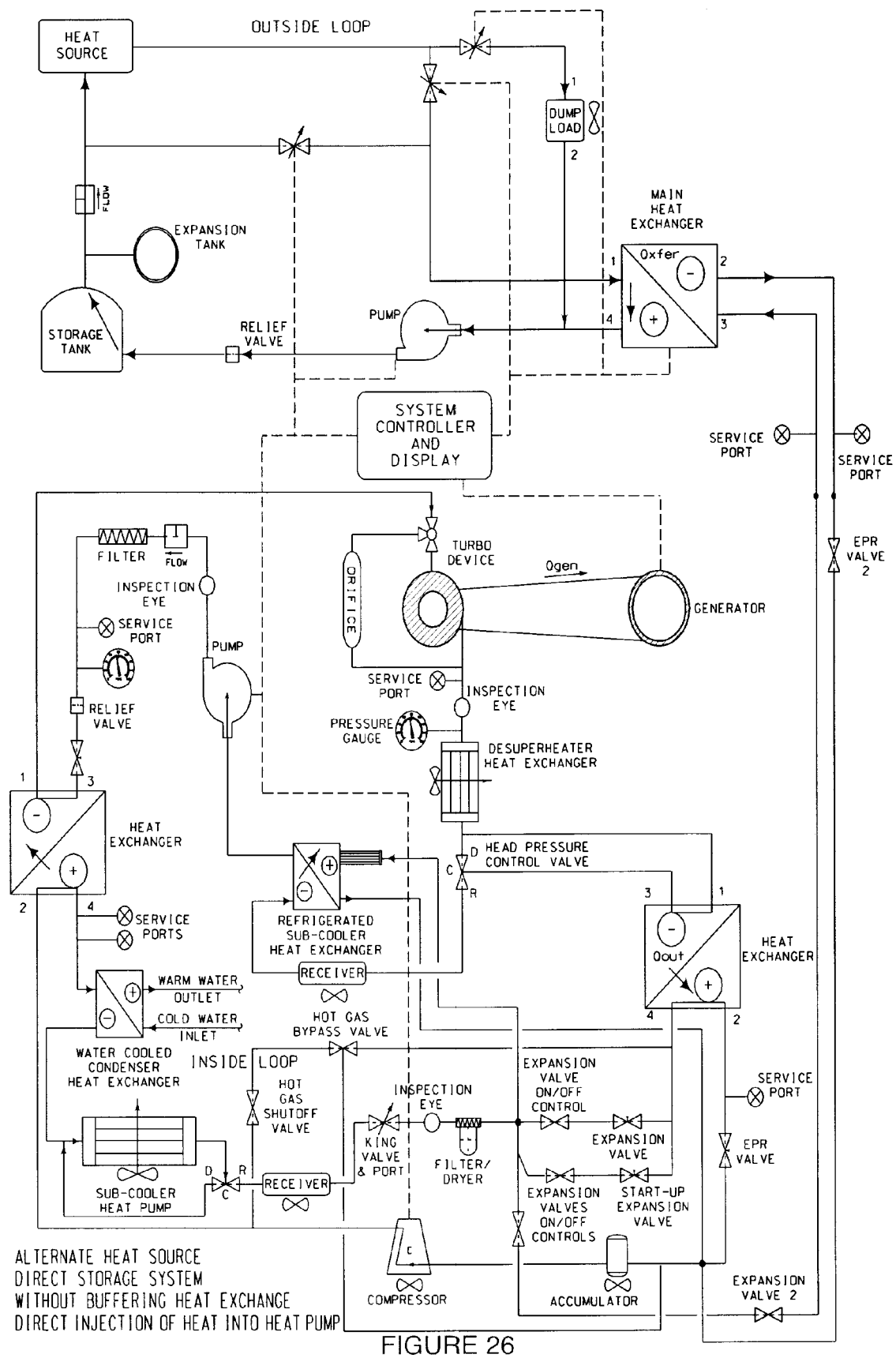
FIG. 26 illustrates the full system similar to that shown in FIG. 22 but further including a hot gas bypass and shutoff valve, auxiliary expansion valves for start up, as well as an alternative form of electrical power generation.
Figure 27:
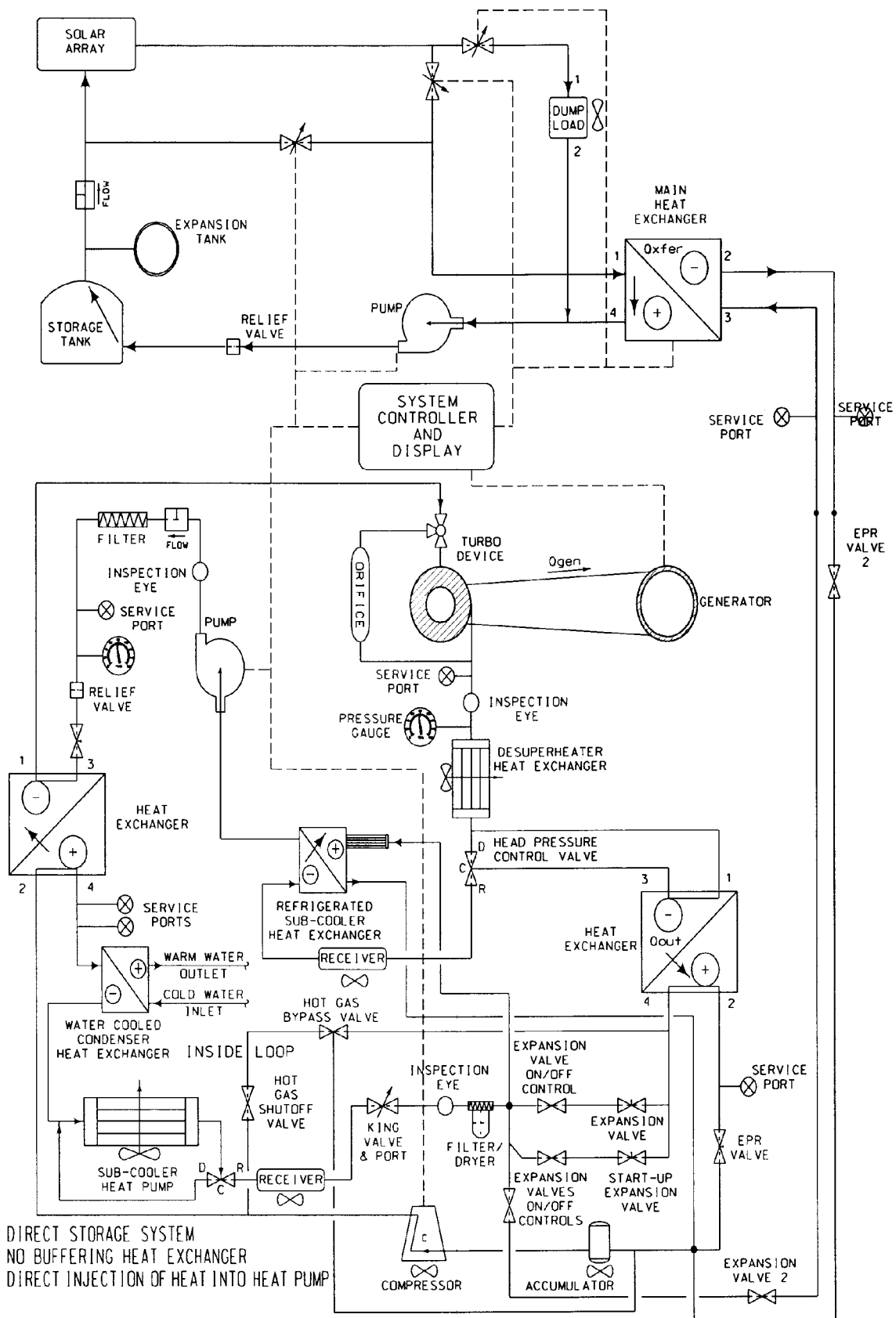
FIG. 27 illustrates the full system similar to that shown in FIG. 23 but further including a hot gas bypass and shutoff valve, auxiliary expansion valves for start up, as well as an alternative form of electrical power generation.

FIG. 19 is a system similar to that shown in FIG. 18 without a buffering heat exchanger on the input loop, and substituting a solar array as a source of heat.

FIGS. 20 through 23 illustrate alternative system embodiment to those shown in FIGS. 16 through 19. In this system embodiment a refrigerated sub-cooler 58 has been substituted to air cooled sub-cooler 38 in the previous embodiment. Refrigerated sub-cooler 58 is located immediately before pump 41 in the turbine. The refrigerated sub-cooler is capable of proper performance at any given ambient temperature. With the air cooled sub-cooler 38, when the air temperature reaches a certain value (in the area of approximately 80 degrees F.) the sub-cooler malfunctions and causes the liquid refrigerant to flash into gas. Once the gas reaches the input of the pump the pump would not function properly and the turbine would stop working. In those cases where the ambient temperature is too warm the alternative sub-cooler design that uses refrigeration is required. A small amount of the heat pump capacity is tapped off through capillary tubes and sent to a heat exchange equipped to use it, as shown in FIGS. 20 through 23. This refrigeration effect will reduce the liquid temperature flowing to the turbine pump 41 to a temperature several degrees below ambient. It will be cold enough that it cannot flash to a gas. This will eliminate the pump malfunction and consequent stopping of the turbine. Also, shown in the system embodiment of FIGS. 20-23 is an optional hot gas by pass valve 60. By pass valve 60 acts to increase the flow of refrigerant during periods of low flow. This may occur at start up when the heat load is low. The hot gas injected increases the volume and velocity of the flow through the system, preventing unwanted buildup of refrigerant oil through the heat pump loop.

The system embodiment shown in FIGS. 24 through 27 illustrate an alternative embodiment to the system shown in FIGS. 20 through 23. In this embodiment a start-up expansion valve 62 is employed in addition to the main expansion valve 31. The main expansion valve 31 is a very large capacity unit designed to handle the full load imposed on the heat pump loop of the engine. This valve is self controlling; adjusting its output as required over a range of from 20% of the nameplate value up to a maximum of perhaps 120% of the nameplate value. Unfortunately, when the unit is first started, and is warming up, the load imposed is considerably less than 20% of the nameplate value. Hence the main expansion valve cannot be used, as it is impossible for it to throttle down far enough. The result is over-feeding of refrigerant, which overloads and overfills the heat exchanger to which it is connected. This problem is solved by having the control system switch between two valves. The main valve 31 is turned off during warm-up and a much smaller starter expansion valve 62 is turned on in its place. This starter expansion valve 62 has no problem throttling down far enough. Later, when the pressure and temperature sensors detect that the starter valve 62 has reached its full capacity, the starter valve 62 is switched off, and the system reverts to using the main expansion valve 31 instead. This embodiment discloses a generator 64 which can be any configuration that is capable of converting mechanical work into electrical energy. It should be recognized that this type of generator can be used in any of the aforementioned power system embodiments. One possible configuration would be the use of a three phase motor as a generator. It is self regulating, producing electrical power in exact proportion to the horsepower applied. This eliminates the need for costly power conversion and regulating components entirely. The three phase motor must be properly sized such that the maximum available shaft horsepower does not overload the motor electrically. Likewise, the mechanical output of heat engine 27 can be used as a power take off for any type of mechanical equipment that uses shaft horse power, such as but not limited to pumps, compressors, milling equipment, etc.

It will be appreciated that all of these components, including pressure gauges and service ports and other items not specifically discussed could be arranged in slightly different orders, and still lie within the intent of the system. The diagram presented is illustrative and not limiting.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A heat and power generating system comprising;
  a thermodynamic external heat source loop having an external heat source of approximately 150° F. or less and a first working fluid in heat exchange relationship with a heat source; a first pump within said heat source loop to circulate said first working fluid and a base heat exchanger;
  a thermodynamic heat engine loop having a second working fluid, said second working fluid being a refrigerant and a pump in said thermodynamic heat engine loop to circulate said second working fluid and raise its pressure during the thermodynamic cycle and a heat engine in fluid communication with said second working fluid;

a thermodynamic heat reclaiming loop having a third working fluid, said third working fluid being a refrigerant, and a compressor in said thermodynamic heat reclaiming loop to circulate said third working fluid and increase the pressure and temperature of the third working fluid within the heat reclaiming loop, said thermodynamic heat reclaiming loop comprising a plurality of subsidiary loops each operating at a different temperature from the others including a first subsidiary loop configured to communicate with said base heat exchanger transferring heat from said first working fluid to said third working fluid;

said heat reclaiming loop having a second subsidiary loop including a heat input heat exchanger, said heat input heat exchanger configured to transfer heat from said heat engine loop to said heat reclaiming loop at a different temperature from that of the other said subsidiary loops, said input heat exchanger configured to perform a majority of such heat transfer in said second subsidiary loop when said second working fluid is evaporating and said third working fluid is condensing in simultaneous inverse phase change;

said heat reclaiming loop having a third subsidiary loop including a separate heat output heat exchanger, said output heat exchanger configured to transfer heat into said heat engine loop from said heat reclaiming loop, said third subsidiary loop operating at a different temperature from the temperatures of said first and second subsidiary loops, said heat output heat exchanger configured to perform a majority of such heat transfer in said third subsidiary loop when said second working fluid is condensing and said third working fluid is evaporating in simultaneous inverse phase change.

2. The power generating system of claim 1, wherein said second working fluid will operate at temperatures of less than 300° F. and at pressures of less than 200 psig and the working fluid will condense at temperatures as low as 80° F. and boil at about 70° F. when circulated through the thermodynamic heat engine loop.

3. The power generating system of claim 1 wherein said thermodynamic heat source loop includes a holding tank containing a heat storage medium, said heat storage medium being a phase change material that will change from a solid to a liquid at a given constant temperature, whereby the heat of fusion of the heat storage material facilitates the storage of large amounts of heat in a small volume and said thermodynamic heat source loop maintains a constant output temperature while the temperature of the external heat source may fluctuate.

4. The power generating system of claim 1 wherein said heat source originates with waste heat from an air-conditioning system, other power plant or other thermo dynamic systems.

5. The power generating system of claim 2 wherein said heat source includes a power plant turbine condenser.

6. The power generating system of claim 2 wherein said heat source includes a thermal solar array.

7. The power generating system of claim 2 wherein said heat source is geothermal.

8. The power generating system of claim 2 wherein said heat engine includes a rotating member, said member configured as a generally circular disk having a first planar face and a second planar face, said rotating member further including a peripheral outer surface contiguous with both said first planar outer surface and said second outer surface and, a blade mounted on the peripheral outer surface of said rotating member and having a height extending radially outward from said peripheral outer surface and a width extending between said first planar surface and said second planar surface; said blade having a concave surface on a first side of the blade and a convex surface on a second side of the blade, both the convex and concave surfaces extending from a location adjacent the first planar surface to a location adjacent the second planar surface;

a source of gaseous working fluid;

a housing enclosing said rotating member, said housing having at least one gas inlet port for introducing said second working fluid into said heat engine, and at least one gas exhaust port and a chamber sized and configured to receive said rotating member; each of said at least one gas inlet port including a nozzle creating a gas flow of very high velocity, said nozzle having a tapered tip at the exit of the nozzle for directing the very high velocity gas flow at a very shallow angle on to the concave surface of said blade.

9. The power system of claim 8 wherein said high velocity gas flow exits said nozzle and enters nearly straight on to the concave surface of said blade, the high velocity gas flow then turns and follows the curvature of said concave surface and exits the concave surface of said blade flowing in a direction in the range of 120 to nearly 180 degrees from the direction that the high velocity gas flow entered upon the concave surface of the blade thereby imparting a momentum equal to almost twice the momentum of the high velocity gas flow.

10. The power system of claim 9, wherein said high velocity gas flow across the concave surface of the blade creates a higher pressure adjacent the concave surface of the blade than the pressure adjacent the convex surface of the blade, whereby the pressure differential multiplied by the surface are of the blade produces a force which is used to turn the rotating member.

11. The power system of claim 2 wherein said thermodynamic heat engine loop includes a waste heat output heat exchanger and a separate heat reclaiming input heat exchanger, said waste heat output exchanger being in heat exchange relationship with said heat reclaiming loop heat input heat exchanger and, said heat reclaiming input heat exchanger being in heat exchange relationship with said heat reclaiming loop heat output heat exchanger.

12. The power system of claim 2 wherein the thermodynamic heat reclaiming loop includes an expansion valve thereby reducing the pressure in the heat reclaiming loop and counterbalancing the compressor and at the same time producing a cooling action necessary to remove heat from the thermodynamic heat engine loop.

13. The power system of claim 12 wherein the thermodynamic heat reclaiming loop further includes a first pressure regulating valve that prevents the pressure from the expansion valve from dropping too low thereby avoiding overcooling of the reclaiming loop output heat exchanger and a second pressure regulator that prevents the pressure from the compressor from dropping too low.

14. The power system of claim 13 wherein the thermodynamic heat reclaiming loop further includes an accumulator that catches stray liquid thereby preventing stray liquid from reaching the compressor and causing damage and a holding vessel which holds a sufficient supply of refrigerant to prevent a shortage of said third working fluid.

15. The power system of claim 14 wherein the thermodynamic heat reclaiming loop further includes a sub-cooling heat exchanger which expels excess heat from the heat reclaiming loop to the atmosphere as required thereby keeping the third working fluid from creating unwanted gas bubbles that can cause the valves to malfunction and a filter and drier element that removes stray particles and moisture from the third working fluid thereby preventing icing, damage and corrosion.

16. The power system of claim 2 wherein the thermodynamic heat source loop includes bypass valves which permit bypassing the heat source around said heat exchanger when desired, thereby bypassing the heat into a dump load.

17. The power system of claim 16 wherein said thermodynamic heat source loop includes a relief valve to avoid the buildup of a damaging excess of pressure.

18. A heat and power generating system comprising;
a thermodynamic external heat source loop having an external heat source of approximately 150° F. or less and a first working fluid in heat exchange relationship with a heat source; a first pump within said heat source loop to circulate said first working fluid to a heat storage tank and a buffering heat source loop including a second pump that transfers heat from said heat storage tank to a heat exchanger;
a thermodynamic heat engine loop having a second working fluid, said second working fluid being a refrigerant and a pump in said thermodynamic heat engine loop to circulate said second working fluid and raise its pressure during the thermodynamic cycle and a heat engine in fluid communication with said second working fluid and
a thermodynamic heat reclaiming loop having a third working fluid, said third working fluid being a refrigerant, and a compressor in said thermodynamic heat reclaiming loop to circulate said third working fluid and increase the pressure and temperature of the third working fluid within the heat reclaiming loop, said thermodynamic heat reclaiming loop comprising a plurality of subsidiary loops each operating at a different temperature from the others including a first subsidiary loop configured to communicate with said base heat exchanger transferring heat from said first working fluid to said third working fluid;
said heat reclaiming loop having a second subsidiary loop including a heat input heat exchanger, said heat input heat exchanger configured to transfer heat from said heat engine loop to said heat reclaiming loop at a different temperature from that of the other said subsidiary loops said input heat exchanger configured to perform a majority of such heat transfer in said second subsidiary loop when said second working fluid is evaporating and said third working fluid is condensing in simultaneous inverse phase change;
said heat reclaiming loop having a third subsidiary loop including a separate heat output heat exchanger, said output heat exchanger configured to transfers heat into said heat engine loop from said heat reclaiming loop, said third subsidiary loop operating at a different temperature from the temperatures of said first and second subsidiary loops, said heat output heat exchanger configured to perform a majority of such heat transfer in said third subsidiary loop when said second working fluid is condensing and said third working fluid is evaporating in simultaneous inverse phase change;
said heat engine includes a rotating member, said member configured as a generally circular disk having a first planar face and a second planar face, said rotating member further including a peripheral outer surface contiguous with both said first planar surface and said second outer surface and,
at least one blade mounted on the peripheral outer surface of said rotating member and having a height extending radially outward from said peripheral outer surface and a width extending between said first planar surface and said second planar surface; said blade having a concave surface on a first side of the blade and a convex surface on a second side of the blade, both the convex and concave surfaces extending from a location adjacent the first planar surface to a location adjacent the second planar surface;
a housing enclosing said rotating member, said housing having at least one gas inlet port for introducing said second working fluid into said heat engine, and at least one gas exhaust port and a chamber sized and configured to receive said rotating member; each of said at least one gas inlet port including a nozzle creating a gas flow of very high velocity, said nozzle having a tapered tip at the exit of the nozzle for directing the very high velocity gas flow at a very shallow angle on to the concave surface of said blade, said high velocity gas flow exits said nozzle and enters nearly straight on to the concave surface of said blade, the high velocity gas flow then turns and follows the curvature of said concave surface and exits the concave surface of said blade flowing in a direction of between approximately 120 to nearly 180 degrees from the direction that the high velocity gas flow entered upon the concave surface of the blade thereby imparting a momentum equal to almost twice the momentum of the high velocity gas flow, and, said high velocity gas flow across the concave surface of the blade creates a higher pressure adjacent the concave surface of the blade than the pressure adjacent the convex surface of the blade, whereby the pressure differential multiplied by the surface area of the blade produces a force which is used to turn the rotating member.

19. The power generating system of claim 18, wherein said second working fluid will operate at temperatures of less than 300° F. and at pressures of less than 200 psig and the working fluid will condense at temperatures as low as 80° F. and boil at about 70° F. when circulated through the thermodynamic heat engine loop.

20. The power generating system of claim 18 wherein said heat storage tank includes a holding tank containing a heat storage medium, said heat storage medium being a phase change material that will change from a solid to a liquid at a given constant temperature, whereby the heat of fusion of the heat storage material facilitating the storage of large amounts of heat in a small volume and said thermodynamic heat source loop maintains a constant output temperature while the temperature of the external heat source may fluctuate.

21. The power generating system of claim 18 wherein said heat source originates with waste heat from an air-conditioning system or refrigeration system.

22. The power generating system of claim 18 wherein said heat source includes a power plant turbine condenser.

23. The power generating system of claim 18 wherein said heat source is geothermal or solar.

24. The power system of claim 18 wherein said thermodynamic heat engine loop includes a waste heat output heat exchanger and a separate heat input heat exchanger, said waste heat output exchanger being in heat exchange relationship with said heat reclaiming loop heat input heat exchanger in said second subsidiary loop of said heat reclaiming loop and the great majority of such heat transfer occurs when said second working fluid and said third working fluid are both simultaneously in a phase change state and, said heat input heat exchanger being in heat exchange relationship with said heat reclaiming loop heat output heat exchanger in said third subsidiary loop of said heat reclaiming loop and the majority of heat transfer occurs when said second working fluid and said third working fluid are both simultaneously in a phase change state.

25. The power system of claim 18 wherein the thermodynamic heat reclaiming loop includes an expansion valve thereby reducing the pressure in the heat reclaiming loop and counterbalancing the compressor and at the same time producing a cooling action necessary to remove heat from the thermodynamic heat engine loop.

26. The power system of claim 25 wherein the thermodynamic heat reclaiming loop further includes a first pressure regulating valve that prevents the pressure from the expansion valve from dropping too low thereby avoiding overcooling of the reclaiming loop output heat exchanger and a second pressure regulator that prevents the pressure from the compressor from dropping too low.

27. The power system of claim 26 wherein the thermodynamic heat reclaiming loop further includes an accumulator that catches stray liquid thereby preventing stray liquid from reaching the compressor and causing damage and a holding vessel which holds a sufficient supply of refrigerant for prevent a shortage of said third working fluid.

28. The power system of claim 27 wherein the thermodynamic heat reclaiming loop further includes a sub-cooling heat exchanger which expels excess heat from the heat reclaiming loop to the atmosphere as required thereby keeping the third working fluid from creating unwanted gas bubbles that can cause the valves to malfunction and a filter and drier element that removes stray particles and moisture from the third working fluid thereby preventing icing, damage and corrosion.

29. The power system of claim 18 wherein the thermodynamic heat source loop includes bypass valves which permit bypassing the heat source around said heat exchanger when desired, thereby bypassing the heat into a dump load.

30. The power system of claim 29 wherein said thermodynamic heat source loop includes a relief valve to avoid the buildup of a damaging excess of pressure.

31. The power system of claim 18 wherein the thermodynamic heat source loop and the buffering loop each include expansion tanks to prevent suction pressures from falling too low and causing pump cavitation and to prevent corrosion.

32. The power system of claim 18 wherein a de-superheater is located immediately downstream of said heat engine whereby excess heat is dumped to the environment.

33. The power system of claim 28 further including a water cooled condenser heat exchanger located immediately downstream of the sub cooler heat exchanger that is used only during start up and adjustment phases of operation of the system.

34. The power system of claim 32 wherein the heat engine loop includes a sub cooler located downstream of said de-superheater and upstream of the pump in the thermodynamic heat engine loop.

35. The power system of claim 34 wherein said sub cooler is refrigerated whereby additional heat is transferred from said heat engine loop to a fourth subsidiary loop of said heat reclaiming loop, said fourth subsidiary loop operating a different temperature from the temperatures of said first, second and third subsidiary loops of said heat reclaiming loop.

36. The power system of claim 34 wherein said sub cooler is air cooled.

* * * * *